US006613126B2

(12) United States Patent
Tange et al.

(10) Patent No.: US 6,613,126 B2
(45) Date of Patent: Sep. 2, 2003

(54) METHOD FOR STORING NATURAL GAS BY ADSORPTION AND ADSORBING AGENT FOR USE THEREIN

(75) Inventors: Kyoichi Tange, Mishima (JP); Tamio Shinozawa, Numazu (JP); Hiroshi Hasegawa, Shizuoka (JP); Kouetsu Hibino, Nisshin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/945,707

(22) Filed: Sep. 5, 2001

(65) Prior Publication Data

US 2002/0023539 A1 Feb. 28, 2002

Related U.S. Application Data

(63) Continuation of application No. PCT/JP00/01285, filed on Mar. 3, 2000.

(30) Foreign Application Priority Data

Mar. 5, 1999 (JP) .......................................... 11-058085
Aug. 18, 1999 (JP) .......................................... 11-231716

(51) Int. Cl.[7] .......................... B01D 53/04; B01J 20/20
(52) U.S. Cl. .............................. 95/95; 95/115; 95/143; 95/901; 502/416; 502/526
(58) Field of Search .......................... 95/106, 114, 115, 95/141, 143, 901, 903, 95; 96/121, 132, 135; 502/416, 417, 439, 526; 62/46.1, 46.3; 423/245.1; 585/820, 822, 830

(56) References Cited

U.S. PATENT DOCUMENTS 2,944,031 A * 7/1960 Mason ...................... 208/307
4,350,501 A * 9/1982 Bannon .................. 208/310 R
4,749,384 A * 6/1988 Nowobilski et al. ........ 123/527
4,812,147 A * 3/1989 BeVier ........................ 95/120
4,817,684 A 4/1989 Turko et al.

(List continued on next page.)

FOREIGN PATENT DOCUMENTS

| | | |
|---|---|---|
| JP | 49-104213 | 10/1974 |
| JP | 61-258961 | 11/1986 |
| JP | 5-76754 | 3/1993 |
| JP | 5-317635 | 12/1993 |
| JP | 6-55067 | 3/1994 |
| JP | 8-24636 | 1/1996 |
| JP | 9-183605 | 7/1997 |
| JP | 9-323016 | 12/1997 |
| JP | 11-210994 | 8/1999 |
| JP | 11-270794 | 10/1999 |
| JP | 11-344200 | 12/1999 |
| SU | 1472738 | 4/1989 |

*Primary Examiner*—Duane Smith
*Assistant Examiner*—Frank M. Lawrence
(74) *Attorney, Agent, or Firm*—Finnegan, Henderson, Farabow, Garrett & Dunner, L.L.P.

(57) ABSTRACT

A method for storing natural gas by adsorption which comprises separating an available natural gas in an infrastructure side (10) into a low carbon number component mainly containing methane and ethane and a high carbon number component mainly containing propane, butane and the like, and storing the low carbon number component by adsorption in a first adsorption tank (16) and storing the high carbon number component by adsorption in a second adsorption tank (18). The method can solve the problem that the high carbon number component condenses within a pore of an adsorbing agent and hence the adsorption of the carbon number component, the main component of natural gas, is inhibited, and thus improves the storage density. Accordingly, the method can be used for ensuring a high storage density also for an available natural gas. An adsorbing agent for use in the method is also disclosed.

22 Claims, 16 Drawing Sheets

U.S. PATENT DOCUMENTS

| | | | | | |
|---|---|---|---|---|---|
| 4,982,052 | A | * | 1/1991 | Nolte | 208/310 Z |
| 5,071,820 | A | * | 12/1991 | Quinn et al. | 502/416 |
| 5,292,707 | A | * | 3/1994 | Aparicio et al. | 502/416 |
| 5,461,023 | A | * | 10/1995 | Chang et al. | 502/418 |
| 5,614,459 | A | * | 3/1997 | Mondragon et al. | 502/180 |
| 5,787,605 | A | | 8/1998 | Okui et al. | |
| 5,837,741 | A | * | 11/1998 | Schwarz et al. | 521/124 |
| 5,912,424 | A | * | 6/1999 | Judkins et al. | 95/143 |
| 5,965,483 | A | * | 10/1999 | Baker et al. | 502/425 |

* cited by examiner

METHOD FOR STORING NATURAL GAS BY ADSORPTION AND ADSORBING AGENT FOR USE THEREIN

This application is a continuation of international application number PCT/JP00/01285, filed Mar. 3, 2000, and claims the priority of Japanese Patent Application No. 11/58085, filed Mar. 5, 1999, and Japanese Patent Application No. 11/231716, filed Aug. 18, 1999, the contents of which are incorporated herein by reference.

BACKGROUND OF THE INVENTION

1. Field of the Invention

The present invention relates to a method for storing natural gas and to an improved adsorbent for use in this method.

2. Description of Related Art

A method for storing natural gas which comprises filling a container with an adsorbent such as activated carbon, zeolite, or silica gel, and then adsorbing and storing a natural gas or the like in the container has been proposed in order to store a large amount of a fuel gas such as natural gas under a relatively low pressure.

For example, in Japanese Patent Application Laid-Open No. 258961/1986, there is disclosed the application of such a storage method for use in automobiles.

However, in this conventional method of storing natural gas by the use of the adsorbent, while a large amount of gas can be adsorbed when pure methane is stored, when a natural gas such as Japanese 13A town gas (the main component of which is methane and which also contains additional hydrocarbons such as ethane, propane, butane) is adsorbed and stored, storage density ($V/V_0$) remarkably decreases. This phenomenon is believed to occur because higher carbon components such as propane and butane contained in the natural gas are liquefied in the pores of the adsorbent and clog these pores, thereby impeding the adsorption of methane.

In an example shown in FIG. 15 components of a natural gas enter a pore 52 in an adsorbent 50, such as activated carbon, and are adsorbed. It is intended that the diameter of the pore gradually decrease toward the inside, but, when large molecules 54, being hydrocarbons with larger particle diameters such as propane, butane, and the like enter inside of small molecules 56 of methane or ethane, the large molecules 54 are caught midway in the pore 52, where it is difficult to desorb these trapped large molecules 54. Because the large molecules 54 of propane, butane, and the like have slower molecular velocities, and stronger affinity for the wall of the adsorbent 50, the large molecules 54 are more difficult to desorb than the small molecules 56 of methane or ethane. Additionally, the pressure in the pore 52 is reduced before the adsorption of the natural gas, and, once the inside of the pore 52 is clogged with the large molecules 54, the pressure difference between the inside and the outside of the pore 52 further impedes desorption of the large molecules 54. In this manner, when the inside of the pore 52 is clogged with the large molecules 54, a space is produced at the tip end of the pore 52 because the large molecules 54 cannot advance into the innermost part of the pore 52. Because the component molecules of the natural gas are not adsorbed in this open space, the effective volume of the pore 52 is decreased, thereby decreasing the amount of gas adsorbable by the adsorbent 50.

This decrease becomes especially remarkable as the adsorption/desorption of the natural gas is repeated because additional large molecules 54 clog the pores 52 each time the adsorption/desorption of the natural gas is repeated.

Therefore, the conventional adsorption storage method as described above has a significant problem making its practical use difficult.

Activated carbon is commonly used as an adsorbent for adsorbing and storing natural gas. An improved technique for adsorbing and storing natural gas in activated carbon is disclosed in Japanese Patent Application Laid-Open No. 55067/1994.

Generally, reduction of pore diameter is known to be effective for lowering the potential of natural gas adsorbed in the pores of an adsorbent such as activated carbon and for thereby stabilizing adsorption and storage. Therefore, activated carbon of the smallest available pore diameter is commonly used. In the above-mentioned art, activated carbon with a pore diameter on the order of 5 to 25 angstroms is disclosed, and it is further described elsewhere that the pore diameter about twice the diameter of a methane molecule, that is, of about 11.6 angstroms is preferable.

When the pore diameter is reduced as in the above-described conventional activated carbon, at a pressure as low as about several atmospheres a larger amount of natural gas can be stored than when the natural gas is simply compressed. However, when the pore diameter is small, there is a problem that, even when the storage pressure is raised to increase the storage amount, the adsorption amount does not greatly increase. This is because, when the pore diameter of activated carbon is set to an extremely small value of the order of 5 to 10 angstroms, the adsorption phenomenon becomes saturated at a relatively low pressure. This saturation pressure tends to lower as the pore diameter of the activated carbon decreases.

Moreover, when the activated carbon pore diameter is reduced, it becomes difficult to desorb the natural gas adsorbed in the pores of the activated carbon, so that a step of heating the activated carbon during the desorption or another method must be employed. Therefore, when activated carbon with a small pore diameter is used, there is also a problem that the adsorbed and stored natural gas cannot readily be used.

The present invention has been developed in consideration of the above-described problems, and an object thereof is to provide an adsorption storage method of a natural gas and an adsorbent for use in the method in which, even when a practical natural gas is used, a high storage density ($V/V_0$) can be secured.

SUMMARY OF THE INVENTION

To attain the above-described object, according to the present invention, there is provided an adsorption storage method of a natural gas which comprises the steps of separating the natural gas into a low carbon component and a high carbon component, and independently adsorbing and storing in an adsorbent the low carbon component under a high pressure and the high carbon component under a low pressure. Moreover, in the adsorption storage method of the natural gas, there are provided a first adsorption tank containing the adsorbent to adsorb and store the low carbon component, and a second adsorption tank containing the adsorbent to adsorb and store the high carbon component, the pore diameter of the adsorbent contained in the second adsorption tank being smaller than that of the adsorbent contained in the first adsorption tank, wherein the natural gas is supplied to the first adsorption tank via the second adsorption tank.

Furthermore, in the adsorption storage method of the natural gas, the second adsorption tank may be provided with cooling means.

Additionally, in the adsorption storage method of the natural gas, after the natural gas is temporarily introduced into the second adsorption tank, the pressure may be once lowered before the natural gas is introduced again.

Moreover, in the adsorption storage method of the natural gas, it may be preferable that, when the stored natural gas is desorbed and used, the gas desorbed from the first adsorption tank be removed via the second adsorption tank.

In an additional aspect of the present invention, an adsorption storage method of a natural gas comprises the steps of adsorbing a gas having a smaller molecular size than propane in the adsorbent, and adsorbing the natural gas in the adsorbent.

Additionally, in the adsorption storage method of the natural gas, the adsorbent may be heated to 20° C. or more.

Moreover, in the adsorption storage method of the natural gas, the temperature of the adsorbent may be lowered as the natural gas is adsorbed.

An adsorption storage method of a natural gas according to a further aspect of the present invention is characterized in that, when the natural gas is adsorbed and stored in an adsorbent, the natural gas is adsorbed as it is caused to flow through a gap between the adsorbents.

Additionally, an adsorption storage method of a natural gas by adsorption to an adsorbent may comprise steps of first adsorbing a gas with a smaller molecular size than that of propane into the adsorbent; and subsequently adsorbing the natural gas to the adsorbent.

Moreover, in the adsorption storage method of the natural gas, steps of desorbing the natural gas from the adsorbent under a pressure not greater than the pressure under which the gas having a smaller molecular size than propane was adsorbed, and then again adsorbing only the natural gas may preferably be included.

Moreover, in the adsorption storage method of the natural gas, the gas may be methane or ethane with a high purity.

Furthermore, an adsorbent for use in adsorption and storage of a natural gas may comprise activated carbon subjected to a pressure reducing treatment during a high temperature activating treatment.

Additionally, in the adsorbent, the activated carbon may be treated with an activating treatment agent to which lithium bromide or lithium chloride is added.

Moreover, an adsorbent for use in adsorption and storage of a natural gas may comprise activated carbon which is washed in an organic solvent, and subsequently calcined in an inactive atmosphere or a hydrogen atmosphere in an activating treatment.

Furthermore, a normal paraffin may be adsorbed before the natural gas is adsorbed. Additionally, a side chain paraffin may be separated/removed from the natural gas before the natural gas is adsorbed.

Still further, before the natural gas is adsorbed, the natural gas may be separated into a first component containing no side chain paraffin and a second component containing the side chain paraffin, the first component adsorbed, and then the second component be adsorbed.

Furthermore, in an adsorbent for use in adsorption and storage of a natural gas, the density of pores with pore diameters of 10 angstroms or less is 0.1 cc/g or less.

Additionally, in the adsorbent, a preferable pore diameter distribution peak may be in a range of 12 to 35 angstroms.

Moreover, in the adsorbent, the pore surfaces may be coated with a metal selected from the group consisting of Cu, Fe, Ag, Au, Ir and W.

Furthermore, in the adsorbent, the amount of the metal coated on the surfaces of the pores may preferably be in a range of 5 to 50 wt %.

DETAILED DESCRIPTION OF THE PREFERRED EMBODIMENT

The best mode for carrying out the present invention will be described hereinafter using illustrative embodiments with reference to the drawings.

EXAMPLE 1

Figure 1:
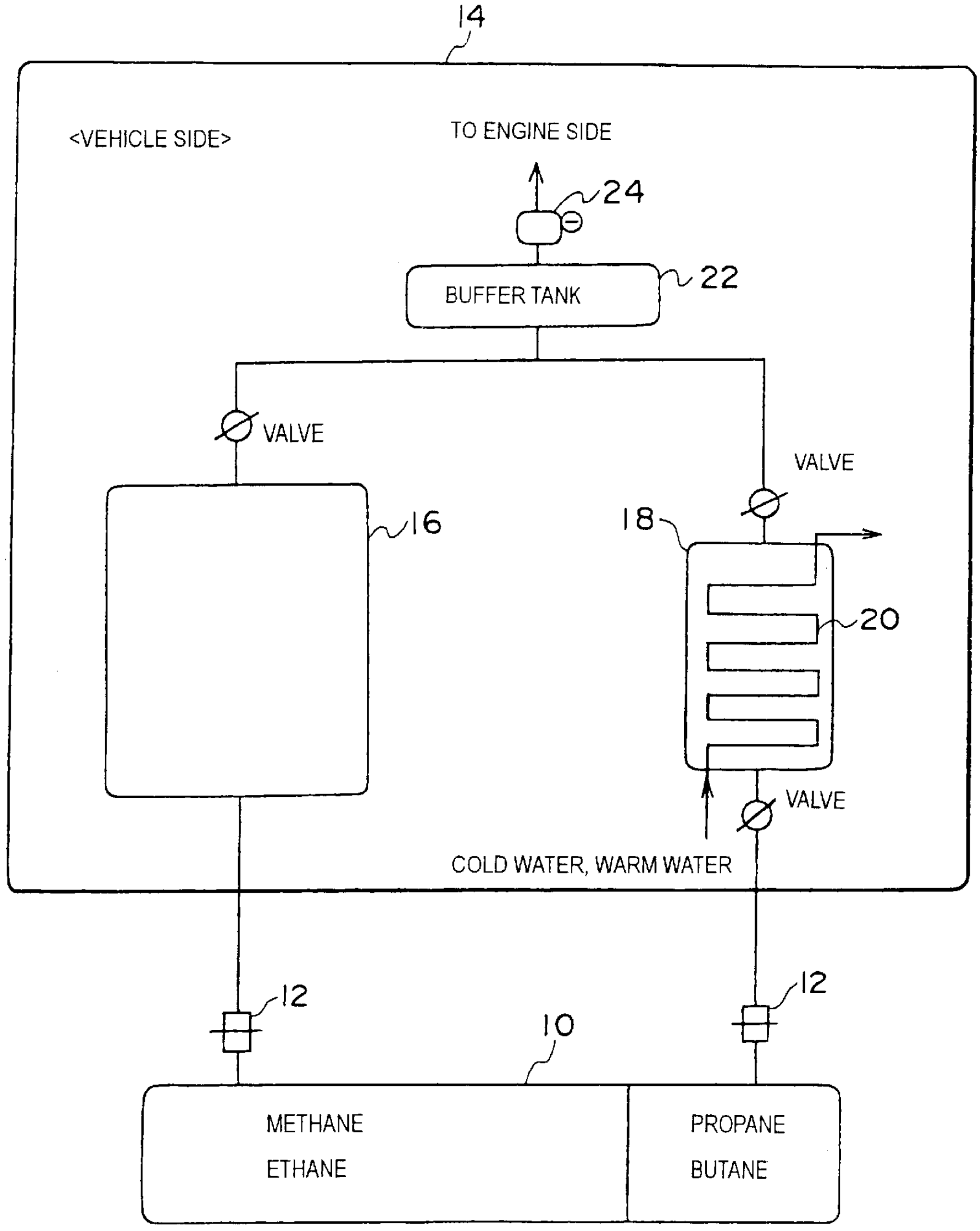
FIG. 1 is a diagram showing a first example adsorption storage method for natural gas according to the present invention.

FIG. 1 shows a constitution for carrying out a first embodiment of a natural gas adsorption storage method according to the present invention. In FIG. 1, on an infraside 10, a natural gas 13A is separated into low carbon components such as methane and ethane and high carbon components such as propane and butane. Such separation can be accomplished by controlling the temperature and pressure of the natural gas. Specifically, the temperature of the natural gas is maintained in a range of −50° C. to −100° C. in a sufficiently insulated tank, and the high carbon components such as propane and butane are condensed and liquefied by compression. Moreover, the low carbon components such as methane and ethane are maintained in a gaseous state. Thereby, the low carbon components and high carbon components can be separated.

The low carbon components and high carbon components separated in this manner are supplied to a vehicle side 14 via a coupler 12 by a pump (not shown). In this case, the low carbon components such as methane and ethane are fed to a first adsorption tank 16 containing an adsorbent to absorb and store the low carbon components, and the high carbon components such as propane and butane are fed to a second adsorption tank 18 containing an adsorbent to absorb and store the high carbon components via pumps. The components are fed to the first adsorption tank 16 under a pressure of about 20 MPa, and to the second adsorption tank 18 under a pressure of about 1 MPa or less, but more than 0.8 MPa.

The components adsorbed and stored in the second adsorption tank 18 are mainly propane and butane. Moreover, the methane or ethane gas adsorbed and stored in the first adsorption tank 16 is sufficiently cooled, and this moderates a temperature rise by adsorption heat during filling.

As described above, the natural gas components are separated according to carbon number, are stored in separate tanks, and desorbed from these respective tanks during use. In this manner, as low carbon components are desorbed from the first adsorption tank in a pressure range of around 20 MPa to 0.8 MPa, the high carbon number component taken out of the second adsorption tank is desorbed by raising a pressure in a compressor. Alternatively, the gas temperature in the second adsorption tank is raised to 100 to 300° C. in a heat exchanger 20, and the vapor pressure is preferably controlled to match that of the first adsorption tank.

By separating, adsorbing, and storing the components in this manner, $V/V_0=350$ in the first adsorption tank at a storage pressure of 20 MPa, while the storage density ($V/V_0$) in the conventional compressed natural gas (CNG) is in a range of 240 to 280 at a storage pressure of 20 MPa. Even when the first adsorption tank is matched with the second adsorption tank, a value of the order of 330 can be obtained because, by separating the high carbon components which readily liquefy on the adsorbent surface or inside the pore to destroys the adsorbent pores and easily deteriorates $V/V_0$, the $V/V_0$ of the low carbon components such as methane can be enhanced. Further, by heating or another operation, the decrease of the storage density of the high carbon number component can be suppressed.

Moreover, when higher and lower components are separate during repeated adsorption and storage, only the difficult-to-adsorb high carbon components remain in the adsorbent pore, which solves the earlier described problem of reduced storage density of low carbon components.

Additionally, the low carbon components and high carbon components adsorbed and stored in the first adsorption tank 16 and second adsorption tank 18, respectively, are again mixed in a buffer tank 22 during use, adjusted in pressure by a regulator 24, and then supplied to an engine or output.

Figure 2:
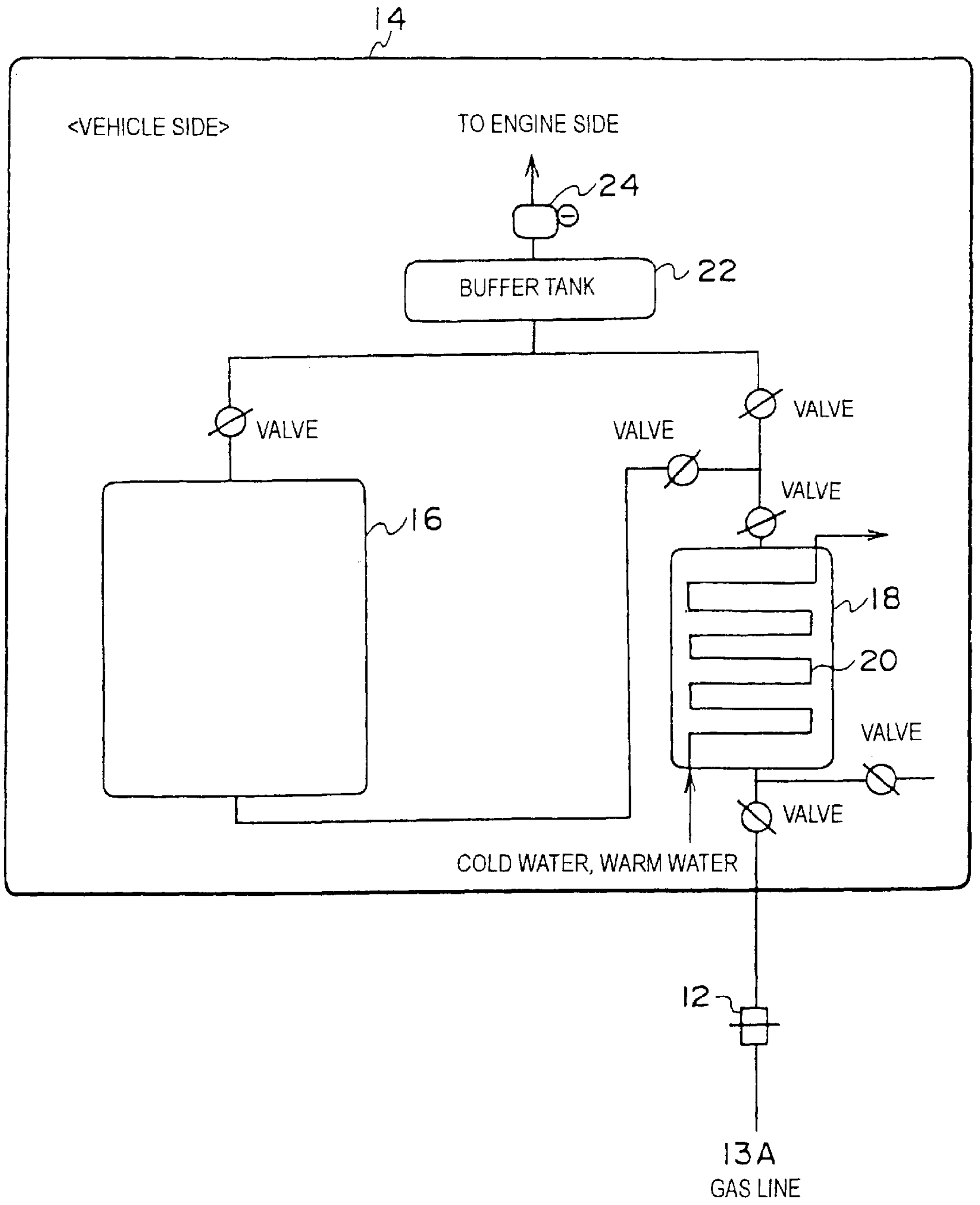
FIG. 2 is a diagram showing a modification to the configuration of the first example.

FIG. 2 shows an additional example of a device for carrying out the adsorption storage method of the natural gas according to the present embodiment. In FIG. 2, the practical natural gas 13A is supplied toward a vehicle via a coupler 12 from an infra-side (not shown). The vehicle side is provided with the second adsorption tank 18 in which liquefied petroleum gases (LPG) such as propane and butane are condensed on the order of 0.2 to 1 MPa and held in a liquid state, and the above-described 13A gas is introduced to the second adsorption tank 18. The introduced 13A gas is bubbled into the liquefied petroleum gas, and the high carbon components such as propane and butane in 13A are dissolved in the liquefied petroleum gas and thereby separated.

Moreover, methane gas containing ethane as a low carbon component which is not adsorbed by the second adsorption tank 18 is introduced to the first adsorption tank 16, and adsorbed and stored by the adsorbent contained therein.

As described above, by storing the higher carbon components in the second adsorption tank 18, and adsorbing and storing the low carbon components in the first adsorption tank 16, the effect similar to that of the example shown in FIG. 1 can be obtained. Additionally, when the gas stored in the first adsorption tank 16 and second adsorption tank 18 is used as a fuel, in a similar manner as in the system shown in FIG. 1, the low carbon component and high carbon number component are mixed in the buffer tank 22, then adjusted in pressure by the regulator 24 and supplied to the engine side. In this case, the second adsorption tank 18 for storing the high carbon number component is provided with the heat exchanger 20 in which cold water and warm water can be passed similarly to FIG. 1, and the supply to the engine side can be performed by heating with warm water as occasion demands. Moreover, by cooling the 13A gas before introduction, the vapor pressure of the liquefied petroleum gas lowers, so that the separation by the second adsorption tank 18 can further efficiently be performed.

Additionally, while FIG. 2 shows an example in which the first adsorption tank 16 and second adsorption tank 18 are mounted on the vehicle side 14, these may be installed on a gas supply stand on the infra-side.

Figure 3:
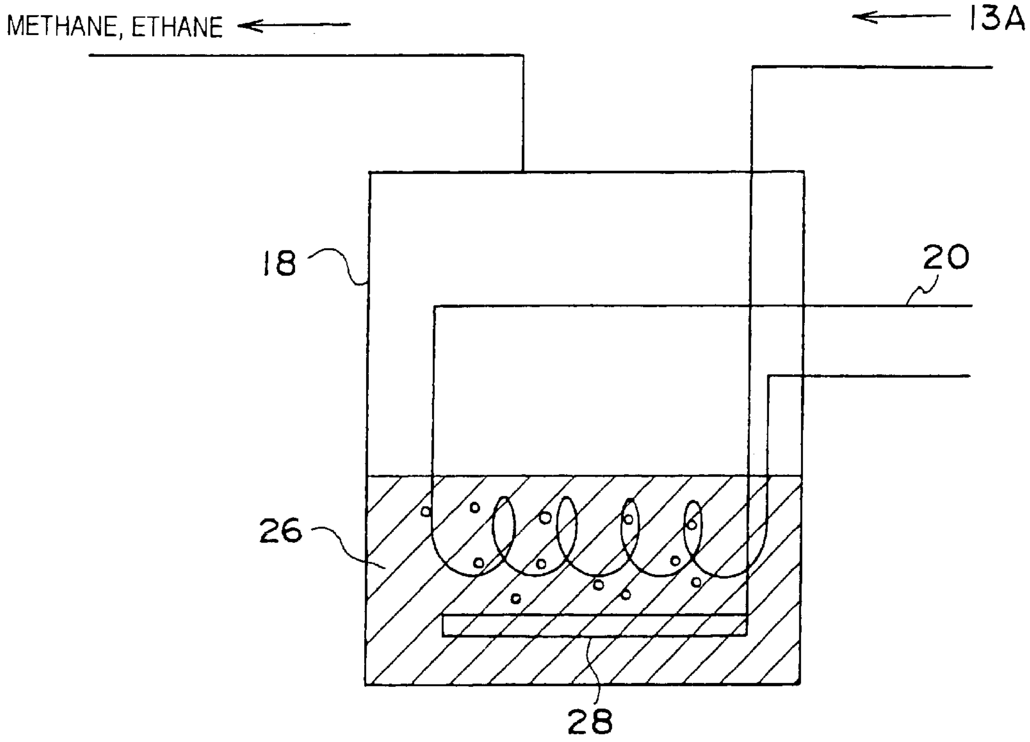
FIG. 3 is a diagram showing an example second adsorption tank.

FIG. 3 shows an example of the first adsorption tank 16 shown in FIG. 2. A liquefied petroleum gas 26 is held inside the first adsorption tank 16, and a bubbler 28 is disposed in the liquid-state liquefied petroleum gas 26. The 13A gas is bubbled into the liquefied petroleum gas 26 via the bubbler 28. Thereby, the higher carbon components such as propane and butane are dissolved in the liquefied petroleum gas 26, only the low carbon components such as methane and ethane exist in the gas phase, and the low carbon components are fed to the first adsorption tank 16.

Figure 4:
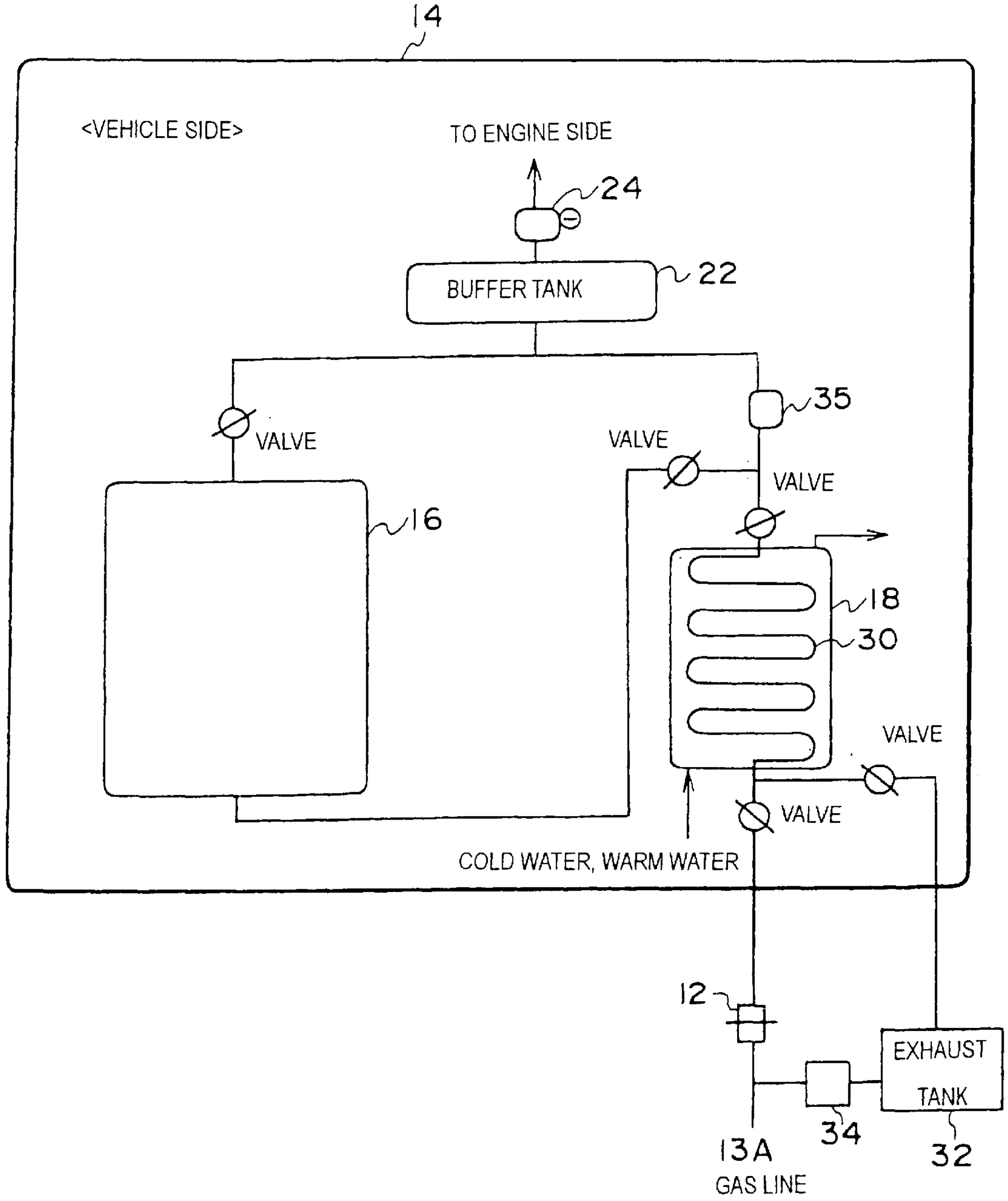
FIG. 4 is a diagram showing another modification to the configuration of the first example.

FIG. 4 shows another modified example of the adsorption storage method of the natural gas according to the present embodiment. In FIG. 4, the second adsorption tank 18 is provided with tubular pressure piping 30 filled with an adsorbent. The 13A gas introduced via the coupler 12 from the outside first flows through the pressure piping 30 of the second adsorption tank 18, in which the high carbon components such as propane and butane are adsorbed. Thereby, the low carbon components such as methane and ethane and the high carbon components such as propane and butane are separated. The low carbon component separated in this manner is introduced to the first adsorption tank 16, and adsorbed and stored by the adsorbent in the tank.

For the adsorbent inside the pressure piping 30, the pore diameter is chosen to be smaller than that of the adsorbent in the first adsorption tank 16. For example, a pore volume ratio of 0.3 cc/cc or more, and pore diameter of 10 angstroms or less, and preferably 7 angstroms or less, may be chosen. For an adsorbent with such a small pore diameter, as the interaction inside the pore can be increased, the high carbon components can be adsorbed with a high efficiency under even high temperatures, and the high carbon number component and low carbon component can be efficiently separated. Additionally, when the peak of the pore diameter distribution of the filler adsorbent in the pressure piping 30 decreases to about 5 angstroms, the proportion occupied by the adsorbent skeleton increases and the storage density $V/V_0$ lowers. Therefore, the pore diameter distribution peak should preferably be set in a range of 7 to 10 angstroms.

As described above, when the high carbon components are adsorbed in the filler adsorbent in the pressure piping 30, condensation can be performed at a near room temperatures, even under a raised pressure. Generally, for liquefied petroleum gases such as propane and butane, when the pressure is raised to about 5 to 8 MPa, the state shifts to a supercritical state depending upon the temperature, and the liquid state cannot be maintained. Therefore, when the 13A gas is fed to the first adsorption tank 16 via the second adsorption tank 18, the condensed high carbon component is vaporized and possibly included into the first adsorption tank 16. On the other hand, by allowing an adsorbent having the above-described pore diameter to adsorb the high carbon number component, the condensed state can be maintained, even under pressures of about 3 to 10 atmospheres, for example, on the condition that cooling is performed with cold water of about 10° C. Moreover, once ¥ condensation occurs, the high carbon number component in the subsequently introduced 13A is also absorbed by a liquid, and the higher and lower carbon component can be efficiently separated. In this case, to preferably suppress the temperature change of the second adsorption tank 18, the second adsorption tank preferably has an insulation structure. Furthermore, to liquefy the high carbon number component more efficiently, the second adsorption tank 18 is preferably provided with cooling means. Even in the example of FIG. 4, the second adsorption tank 18 has a structure in which cold water flows outside the pressure piping 30, and this functions as the cooling means.

As described above, when the high carbon number component is condensed, the liquid density increases. Additionally, even when propane and butane are combined, the high carbon components originally contained in the 13A gas occupy about 5 to 8% of the volume. Therefore, the capacity of the second adsorption tank 18 may be about 3% to 5% of the capacity of the first adsorption tank 16. Thereby, the vehicle space efficiency can be enhanced. In the present device, the temperature of the pressure piping 30 in the first adsorption tank 16 must be raised during the gas use, but the capacity of the first adsorption tank 16 can be reduced as described above, and the amount of heat for use is therefore minimized, so that the capacity to use as the heat exchanger can be reduced. Thereby, the space can be effectively utilized.

When a 30 mmφ stainless material tube was used as the pressure piping 30, as a result of evaluation of the storage density, a value of $V/V_0$=300 to 350 was obtained in the first adsorption tank 16, and $V/V_0$=350 to 400 was obtained in the second adsorption tank 18. In this case, the first adsorption tank 16 and second adsorption tank 18 had a total value $V/V_0$=320 to 370.

Moreover, in a test of the present example, after the adsorption/desorption of the 13A gas was repeated ten times, the ratio of the storage density reduced by less than 5%.

In the present modification example, after the 13A gas is introduced into the pressure piping 30 of the second adsorption tank 18 in a range of about 1 to 3 MPa, the gas may preferably be released to about 0.3 to 0.5 MPa. Thereby, the temperature in the pressure piping 30 is lowered, and the high carbon number component is more easily condensed. The gas released from the pressure piping 30 is extracted, for example, to an exhaust tank 32 shown in FIG. 4. Through this process, the temperature in the pressure piping 30 is lowered by about 10 to 30° C. In this case, since the amount of low carbon components increases as the gas components are released to the exhaust tank 32 from the pressure piping 30, the concentration of high carbon components such as propane and butane increases as residual components in the pressure piping 30. This concentration effect, and the above-described effect of the temperature drop, can lead to increased condensation of the high carbon components.

The gas returned to the exhaust tank 32 is again returned to the vehicle side 14 by a compressor 34 in the subsequent filling process.

In the present example, after the lower and higher carbon components are taken out for use from the first adsorption tank 16 and second adsorption tank 18, respectively, the components are mixed in the buffer tank 22, adjusted in pressure by the regulator 24, and supplied to the engine side. This corresponds to the process outlined in FIG. 1 but, in this example, the high carbon number component is desorbed from the adsorbent by a desorption compressor 35 to extract the high carbon number component from the second adsorption tank 18,. Moreover, in this example embodiment, the desorption is performed while the inside of the second adsorption tank 18 is heated to about 80° C. by warm water supplied from the engine. In this desorption compressor 35, the pressure of the high carbon number component is raised to about 1 to 1.5 MPa, and the component is supplied to the buffer tank 22.

As described above, while the second adsorption tank 18 is heated to about 80° C. by the warm water, the pressure inside the pressure piping 30 in the second adsorption tank 18 is reduced to about 0.05 to 0.1 MPa, then the desorption of the high carbon number component from the second adsorption tank 18 is stopped. As described above, since the capacity of the second adsorption tank 18 is smaller than that of the first adsorption tank 16, the operation time of the desorption compressor 35 can be shortened. Moreover, for supply to an ordinary car engine, the output of the desorption compressor 35 is sufficient in a range of about 50 to 100 W. From the above, the energy consumed in the desorption compressor 35 can only be about 1 to 2% of the entire combustion energy.

Figure 5:
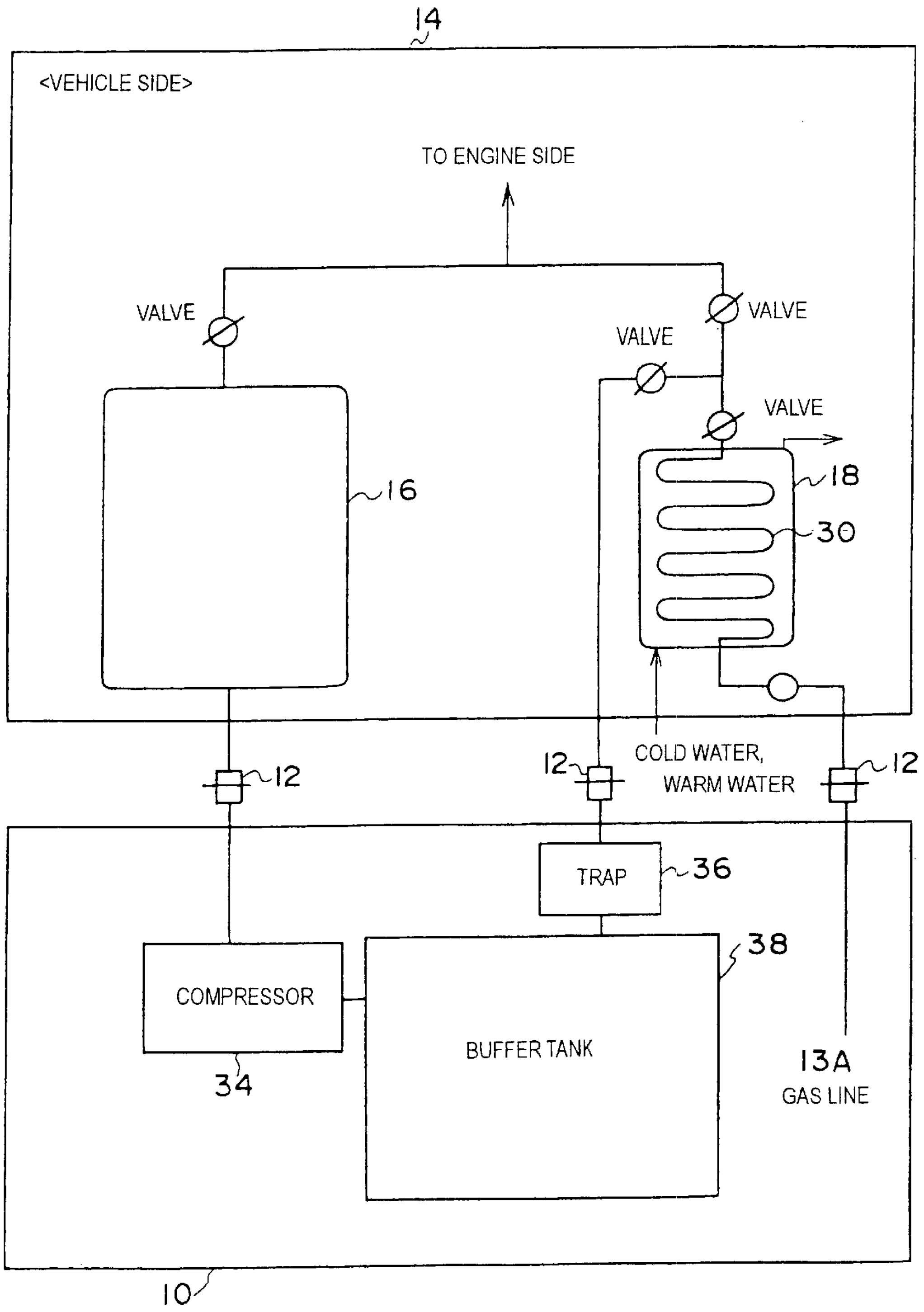
FIG. 5 is a diagram showing still another modification to the configuration of the first example.

FIG. 5 shows still another modification example for carrying out the adsorption storage method of the natural gas according to the present example. In FIG. 5, 13A gas is introduced to the pressure piping 30 in the second adsorption tank 18, the high carbon components are adsorbed/separated here, and subsequently only the low carbon components such as methane and ethane are returned to the infra-side 10. On the infra-side 10, after the high carbon components such as propane and butane are removed by a trap 36, the low carbon components are introduced to a buffer tank 38, and the pressure is raised to 10 to 20 MPa by the compressor 34. The low carbon component whose pressure is raised in this manner is again introduced to the vehicle side 14, and adsorbed and stored by the adsorbent in the first adsorption tank 16. With the present modification, since the pressure of the low carbon component introduced to the first adsorption tank 16 is raised to about 10 to 20 MPa, the storage density $V/V_0$ in the first adsorption tank 16 can be increased.

In the above-described examples, the low carbon component adsorbed in the first adsorption tank 16 and the high carbon number component adsorbed and stored in the second adsorption tank 18 are mixed in the buffer tank 22 and supplied to the engine side, but these two tanks may preferably be disconnected and used independently. Thereby, the mixture ratio of the high carbon number component and low carbon component can be controlled as occasion demands.

Figure 6:
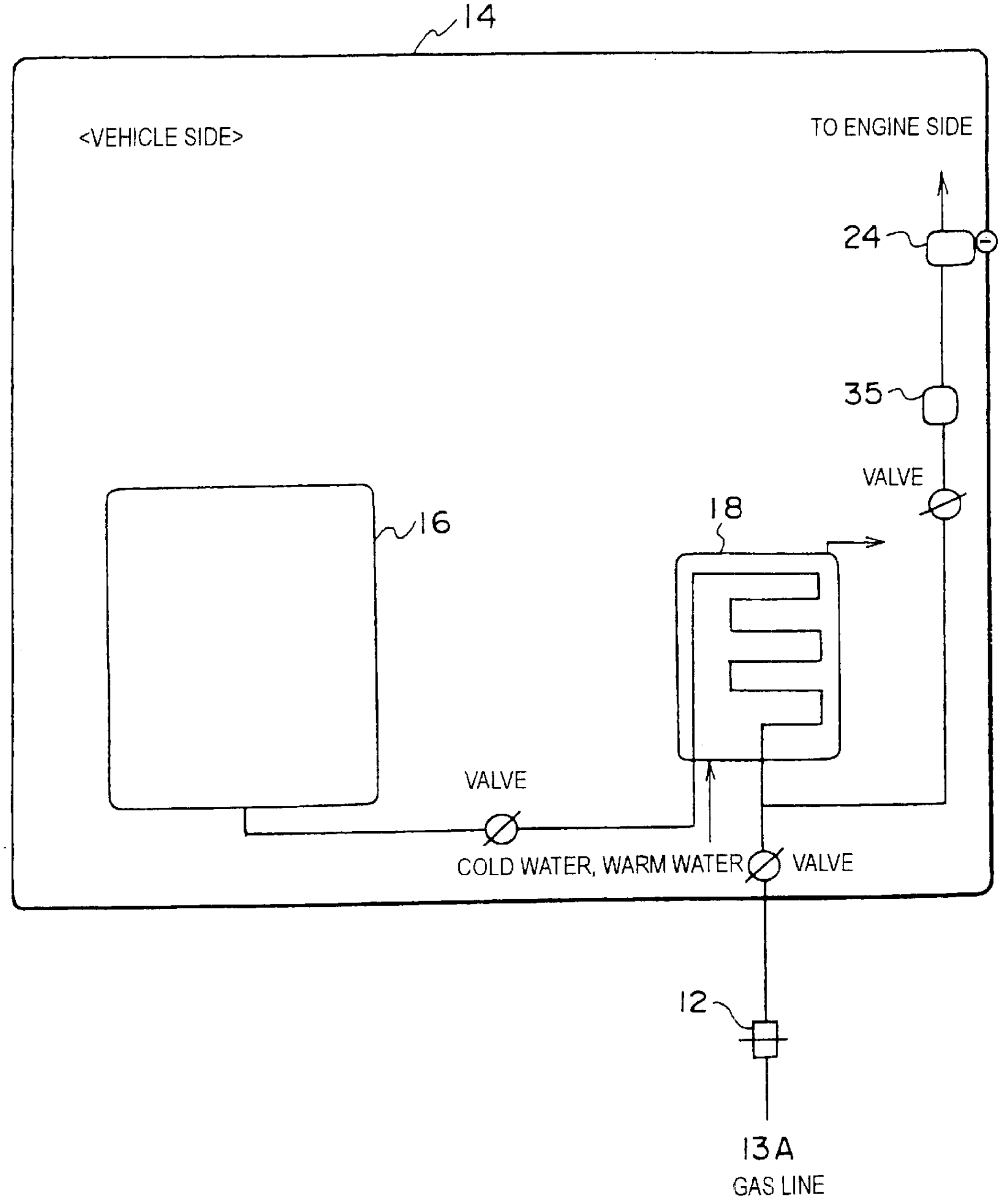
FIG. 6 is a diagram showing a further modification to the configuration of the first example.

FIG. 6 shows further modification example for carrying out the adsorption storage method of the natural gas according to the present example. In FIG. 6, to supply the adsorbed and stored low carbon component and high carbon number component to the engine side, the low carbon components adsorbed and stored in the first adsorption tank 16 are supplied via the second adsorption tank 18 in which the high carbon number component is adsorbed and stored, while the low carbon component and high carbon number component are mixed. In this system, the fuel gas can be supplied to the engine with a very simple structure requiring relatively little energy to extract the fuel gas. In this example, as shown in FIG. 6, the desorption compressor 35 may be used to supply the fuel gas to the engine.

In the above-described modified example, because the low carbon component from the first adsorption tank 16 is only passed through the second adsorption tank 18, the high carbon component in the second adsorption tank 18 need not be gasified, and the energy for extracting the fuel gas can be reduced as described above.

Embodiment 2

In the conventional method as described earlier, to use the adsorbent and adsorb and store the natural gas, and the like, the adsorbent or the fuel gas to adsorb is cooled to generate an adsorption heat. Even when the cooling process is performed in this manner, the adsorption property is not adversely affected in the adsorption of methane alone. However, when higher carbon components such as propane and butane are present in the natural gas 13A, when the temperature is lowered, condensation occurs within the pores of the adsorbent or the like, and the pore is clogged preventing the gas from being diffused. As a result the storage density decreases disadvantageously. For example, while the storage density of the compressed natural gas (CNG) is $V/V_0$=about 240 to 280 at 20 MPa, and when pure methane is adsorbed, the adsorbent is developed so that $V/V_0$=about 300 to 400 can be attained. Even in this case, when natural gas 13A is used, the density is reduced to $V/V_0$=about 200 to 250 by the above-described condensation of the high carbon number component. This condensation of the high carbon number component is remarkable particularly when the pressure is low in the initial filling stage.

To solve the above-described problem, as a result of studies by the present inventors., it has been found that by raising the temperature of the adsorbent to a predetermined temperature during filling, or by heating the filler fuel gas beforehand, the condensation of the high carbon number component is suppressed, and the storage density can be enhanced to the same degree as for pure methane. In this case, the adsorbent temperature is set preferably to 20° C. or more, more preferably to about 30° C. or more. Moreover, as the pressure rises by the adsorption of the fuel gas to the adsorbent, it is preferable to gradually lower the temperature finally to less than 20° C.

Experimental results when 13A gas was adsorbed by activated carbon using the above-described method of the present example, are shown in Table 1.

TABLE 1

| | 13A gas | | | |
|---|---|---|---|---|
| | Present ex. Initial 30° C. heating | Conventional No heating | Pure methane | CNG (15 MPa) |
| Storage density ($V/V_0$) | 230 to 350 | 100 to 150 | 180 to 330 | 170 to 210 |
| Filling success probability (%) | 50% | to 0% | 100% | — |

In addition to results using the method of the present embodiment, the above Table 1 also shows the results obtained using the conventional method described earlier in which the adsorbent was not heated , and those obtained using pure methane. In Table 1, the filling success probability indicates to what extent the adsorbent was free from condensation, and from occurrence of any state in which the 13A gas could not be adsorbed in the course of the filling. As shown in Table 1, by employing the present method, that is, the method in which the adsorbent temperature is heated to 30° C. in the filling initial stage, the filling success probability was 50%. On the other hand, with a conventional method in which no heating was performed, the filling was not successful in any case. While the success probability of 50% for the present method was only about half that when pure methane was used, this is nevertheless a significant improvement over cases when no heating is performed. Moreover, when filling was successful, the storage density of $V/V_0$=about 230 to 350 exceeded that of pure methane. This storage density was higher than using the pressure of 15 MPa of CNG shown in Table 1. Additionally, while in the above-described method, the adsorbent was preheated, similar results can be obtained by preheating the 13A gas rather than the adsorbent.

Figure 7:
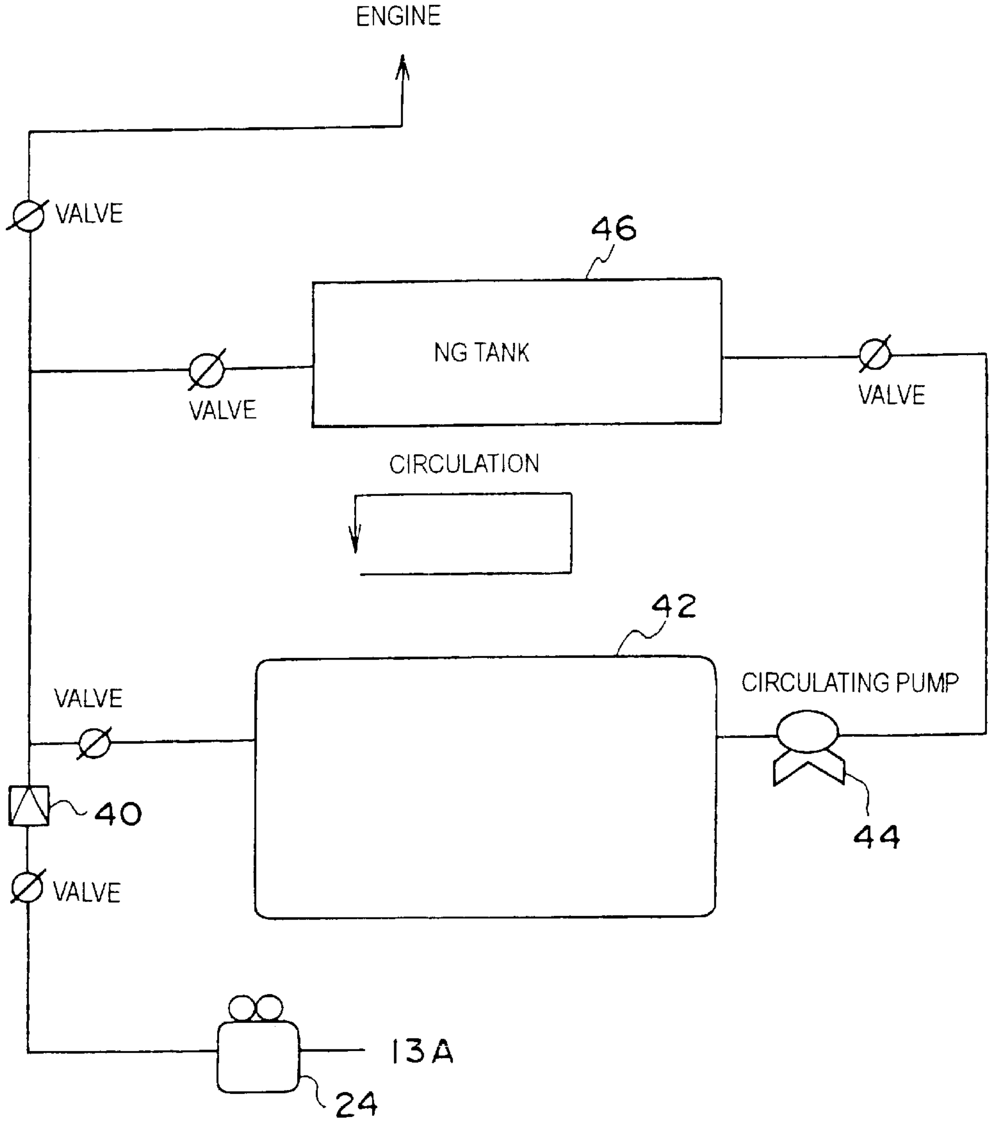
FIG. 7 is a diagram showing a second example adsorption storage method for the natural gas according to the present invention.

In the above-described natural gas adsorption storage method, by heating the adsorbent or the natural gas, condensation is prevented. In addition to this method, even when natural gas is allowed to flow and be adsorbed between the adsorbents during the adsorption and storage to the adsorbent, condensation of natural gas in pores or on the surface of the adsorbent can be prevented. FIG. 7 shows an example for carrying out this adsorption storage method of natural gas.

In FIG. 7, the system is first evacuated and then the natural gas 13A is introduced to a buffer tank 42 via the regulator 24 and a check valve 40. After the pressure within the buffer tank reaches a predetermined pressure, for example, of about 1 to 3 MPa, a circulating pump 44 is operated to circulate the natural gas between the buffer tank 42 and an NG tank 46 containing the adsorbent for adsorbing and storing the natural gas. When the adsorption and storage of the natural gas in the NG tank 46 is performed during the circulation of the natural gas in this manner, the natural gas constantly flows in the gap of the adsorbent during the filling operation so that natural gas condensation in the pores or on the surface of the adsorbent can be prevented, and a decrease in the storage density can thereby be prevented. When adsorption and storage of the natural gas in the NG tank 46 is performed in this circulation state, and when the pressure reaches a predetermined value, for example, of 3 MPa or more, the probability that the natural gas will condense effectively becomes zero, and the circulating pump 44 may then be stopped.

When the adsorption and storage of the natural gas to the NG tank 46 is performed by this method, the storage density $V/V_0$ indicates a value of $V/V_0$=about 230 to 350 similarly to the above-described Table 1, and substantially 100% can be attained as the filling success probability. Additionally, the buffer tank 42 and circulating pump 44 may be installed on either the car side or the infra-side.

In addition to the above-described method, a method of introducing pure methane in the filling initial stage is also proposed as a method of preventing the condensation in the initial stage of the adsorption and storage of the natural gas to the NG tank 46. Specifically, pure methane is first introduced to the NG tank 46 to about 1 MPa or 3 MPa, and the 13A gas is then introduced under an equal or greater pressure. Generally, since condensations of the natural gas in the pores and on the surface of the adsorbent easily occurs in the initial low pressure filling stage, reduction of the storage density by condensation can be inhibited by using pure methane in just the initial filling stage as described above.

In this method, when the changeover pressure to the 13A gas from pure methane increases, the risk of condensation decreases, but the adsorption amount of the 13A gas also decreases and the total caloric storage therefore decreases. Consequently, the initial pure methane filling pressure is determined in consideration of the occurrence of condensation and the necessary caloric value for fuel gas.

Table 2 shows experimental results when an NG tank 46 was filled with 13A gas according the above-described method of introducing pure methane in just the initial stage.

TABLE 2

| | Present example: pure methane → 13A gas | | | |
|---|---|---|---|---|
| | Gas changeover at 1 MPa | Gas changeover at 3 MPa | Pure methane | CNG (15 MPa) |
| Storage density ($V/V_0$) | 370 to 380 | 350 to 360 | 180 to 330 | 170 to 210 |
| Filling success probability (%) | 90% | to 100% | — | — |

As shown in Table 2, in this method, when the tank was filled with pure methane to about 1 MPa, the success probability realized compares favorably with the results shown in Table 1. Furthermore, as the changeover pressures from pure methane to 13A gas was increased, the filling success probability also increased. Moreover, the storage density in this case indicated a sufficiently high value as compared with pure methane and CNG (15 MPa).

Furthermore, for the method of preventing the condensation of natural gas during the adsorption and storage to the NG tank 46, as a result of the studies by the present inventors, it has been found that it is effective to place all the infra-side apparatuses such as the natural gas introduction piping and regulator 24 and the car-side apparatuses such as the NG tank 46 in a room having a constant temperature range during filling, and to set the temperature to be uniform in a range of 20 to 40° C. In this case, even when not only the 13A composition is enhanced but also the butane content is raised above that of the ordinary 13A, a high condensation inhibiting effect can be found.

Figure 8:
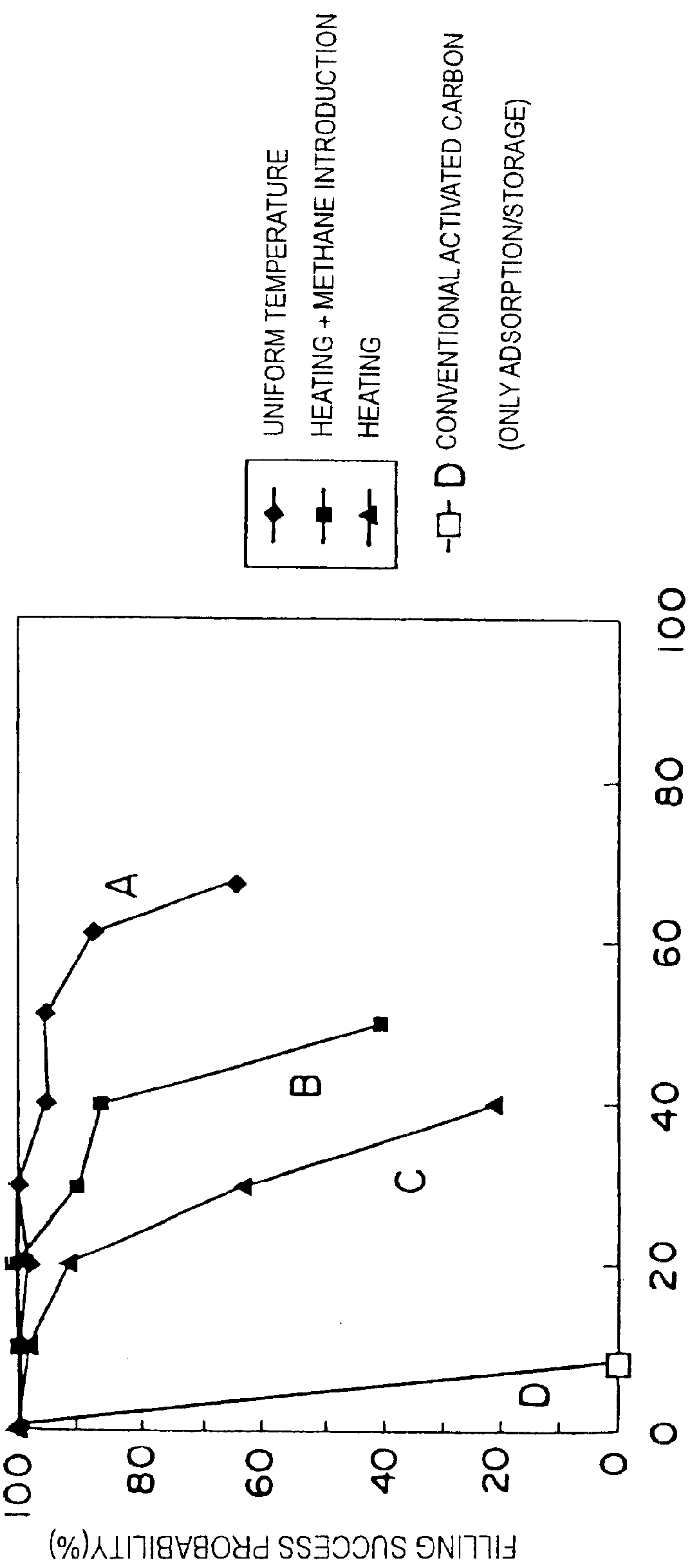
FIG. 8 is a diagram showing a relationship between butane concentration and a filling success probability when natural gas is adsorbed to an adsorbent in various methods.

FIG. 8 shows the transition of the filling success probability when the adsorption and storage are performed in the NG tank 46 by the above-described methods and the butane concentration in the gas to adsorb is raised. In FIG. 8, A shows the result of the above-described uniform temperature method, B shows the result of the above-described method of heating the adsorbent combined with the method of introducing methane in the initial stage, C shows the result only of the method of heating the adsorbent, and D shows the result of only the adsorption to activated carbon. As shown in FIG. 8, according to the method of making uniform the equipment temperature, even when the butane concentration exceeds 60%, the success probability of 80% or more can still be maintained. Additionally, in this case, the used butane is a mixture of normal butane and isobutane at a ratio of 50%:50%.

EXAMPLE 3

Figure 9:
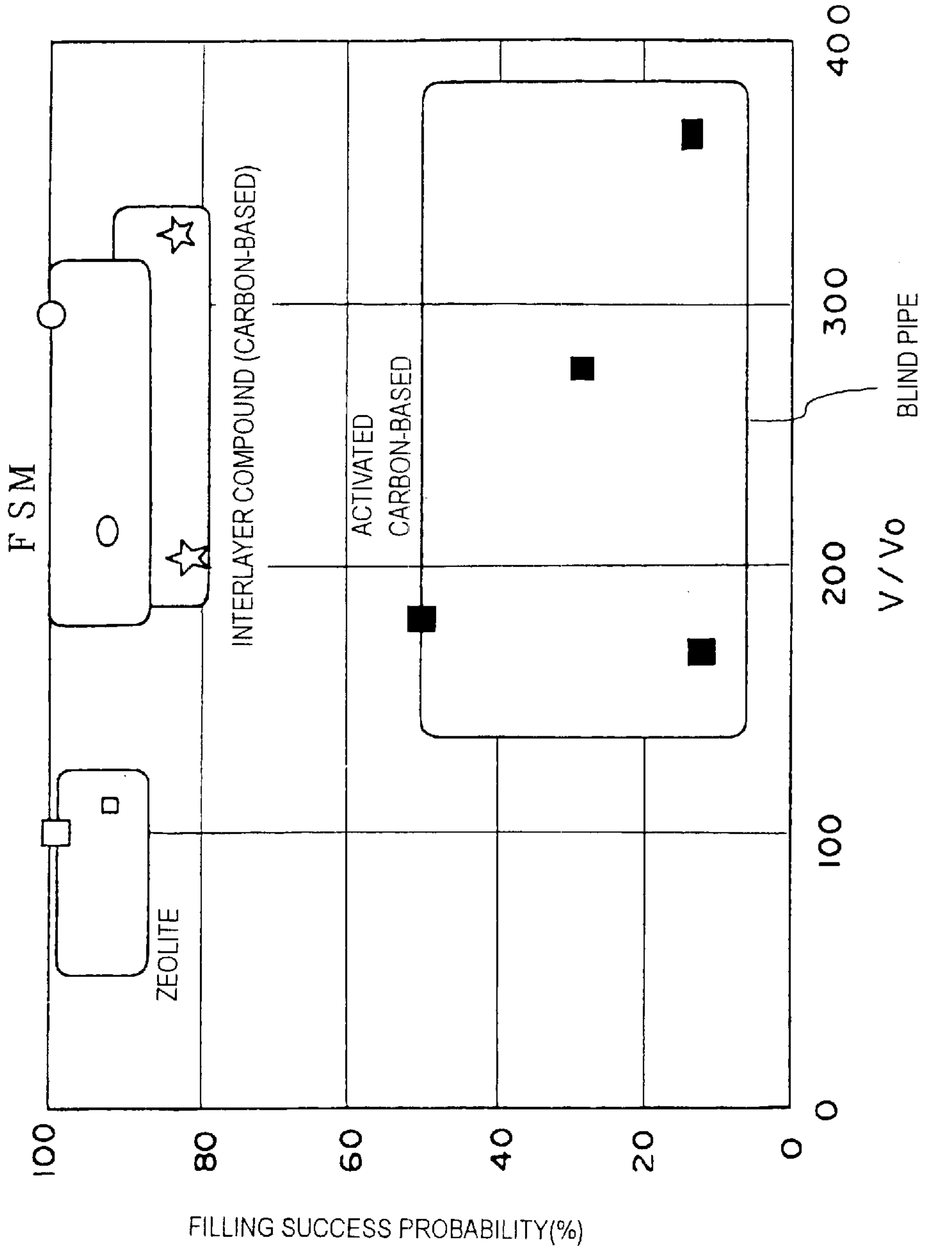
FIG. 9 is a diagram showing a relationship between various adsorbents and the filling success probability.

The preset example relates to the improvement of the adsorption property of the adsorbent. The present inventors investigated various adsorbents with respect to the storage density in the adsorption of the practical natural gas 13A and the filling success probability described in the second example. Results of these investigations are shown in FIG. 9. In FIG. 9, the storage density ($V/V_0$) is shown on the abscissa, and the filling success probability is shown on the ordinate. As shown in FIG. 9, when a carbon-based interlayer compound with a pore diameter peak of 8 to 10 angstroms and a silica-based mesoporous material (FSM) with a pore diameter peak of 20 to 30 angstroms were used, favorable results were obtained both in the storage density $V/V_0$ and the filling success probability. On the other hand, when zeolite with a peak pore diameter of 5 to 8 angstroms was employed, the storage density $V/V_0$ could not be sufficiently increased. When activated carbon was used, the width of the storage density $V/V_0$ was distributed over a broad range, and the filling success probability could not be sufficiently raised.

From the above data, it would appear that the interlayer compound and FSM are superior as among existing adsorbents. However, because these materials are expensive, from the standpoint of cost reduction, enhancing the adsorptivity of activated carbon would be preferable The present inventors Therefore studied the activating treatment method for enhancing the adsorptivity of activated carbon.

Activating treatments for manufacturing activated carbon, include gas activation using water vapor and a chemical activating process of adding a chemical to a raw material, heating the material in an inert gas atmosphere, and performing carbonization and activation at the same time. Examples of the chemicals for use in this chemical activating process include zinc chloride, phosphoric acid, potassium sulfide, potassium hydroxide, potassium thiocyanide, and the like. Moreover, as raw material for manufacturing activated carbon, for example, coconut shells, woods, coals, and the like are all employed.

In activated carbon manufactured using a conventional activating treatment, a large number of functional groups such as hydroxyl groups exist inside the pores and, when hydrocarbon is adsorbed, the functional group is chemically combined with the hydrocarbon, thereby generating a large adsorption heat. Moreover, when the number of functional groups is large, higher carbon components are easily condensed in the pore, especially through the interaction of the high carbon components with the pore surfaces, which causes a drop of storage density during the adsorption of the practical natural gas including a high carbon component. The present inventors studied the activating treatment process in which the number of functional groups present inside the pore of activated carbon can be reduced and developed the following improved method of the chemical activating process is considered as the activating treatment process.

A zinc chloride solution with a specific gravity of about 1.8 is added to the raw material and heated in a range of 600 to 700° C. without any contact with air. By this heating treatment, hydrogen and oxygen in the raw material are discharged as water vapor by the dehydrating action of lead chloride, and carbon with a developed porous structure is formed. The present example is characterized in that, when the raw material is heated to perform a high temperature treatment as described above, a vacuum is simultaneously created, and a pressure reducing treatment is applied. In this case, a vacuum drawing pressure is preferably $10^{-1}$ Torr or less. By performing the pressure reducing treatment, the detachment of water vapor inside the pore is promoted, and as a result the functional groups such as hydroxyl groups inside the pore can be reduced.

Hydrochloric acid is then added to the material treated as described above, zinc chloride is removed, and the acid and base are removed by washing with water. This is ground and dried to form activated carbon of the present example.

As the above-described chemicals, phosphoric acid, sodium phosphate, and calcium phosphate can also be used. When these are used, a high-temperature treatment temperature is set to about 400 to 600° C. Moreover, when potassium hydroxide, sodium hydroxide, and the like are used, the high temperature treatment is performed in 500° C. Furthermore, potassium sulfide, potassium thiocyanide, and the like can also be used.

Table 3 shows the evaluation results of activated carbons manufactured by the chemical activating process of the above-described example, the conventional chemical activating process, and the water vapor activating process. Moreover, as a comparative example, the evaluation result is shown with respect to activated carbon manufactured by drawing a vacuum similarly to the present example during the activation with water vapor and applying the pressure reducing treatment. The raw material of activated carbon used in this case was coconut shell. The high temperature treatment was performed in 700° C., and the vacuum degree of the pressure reducing treatment was $10^{-1}$ Torr.

TABLE 3

| | Water vapor (gas) activating process | | Chemical activating process | |
|---|---|---|---|---|
| | Conventional method | With Vacuum treatment | Conventional method | High-temp. treatment Employing vacuum |
| $V/V_0$ (13A gas, 10 MPa) | 145 | 140 | 130 | 220 |
| Butane adsorption heat (kJ/mol) | 80 | 76 | 75 | 33 |

As seen from Table 3, for activated carbon manufactured by the conventional water vapor activating process and chemical activating process, the storage density $V/V_0$ of the 13A gas in the pressure of 10 MPa was in a range of 130 to 145, and this value was not improved when a vacuum was employed in the water vapor activating process.

On the other hand, for activated carbon manufactured by the activating process of the present example, the storage density of the 13A gas was $V/V_0=220$, which was improved as compared with activated carbon manufactured by the conventional activating process.

Moreover, while Table 3 also shows the adsorption heat during butane adsorption, the adsorption heat is generated during the chemical bonding of the functional group and butane, etc. as described above, and more adsorption heat tends to be produced with a larger number of functional groups. As shown in Table 3, in the conventional water vapor activating process and chemical activating process, the values were substantially unchanged, as the amount of functional groups can be considered to be substantially equal. On the other hand, with the activating process of the present example in which the chemical activating process was combined with vacuum treatment, the adsorption heat was 33 kj/mol, which is about half, or less, of the value using the conventional process. Therefore, it can be considered that in activated carbon manufactured by the activating process of the present example, the amount of functional groups is about half or less than as a result of conventional treatment. Therefore, the condensation of the high carbon number component in the 13A gas is inhibited, and the storage density is enhanced as described above.

In addition to the above-described chemical activating process, instead of the pressure reducing treatment during the high temperature treatment, by employing a method comprising washing with hydrochloric acid and water, subsequently drawing a vacuum, simultaneously performing heating and drying, subsequently adsorbing a nonaqueous or hydrophobic organic solvent, further drawing a vacuum and subsequently performing calcining in an inert gas, the functional groups such as hydroxyl groups can be reduced in the pores of the activated carbon. In this case, by additionally performing the above-described pressure reducing treatment during the high temperature treatment, improved results can be obtained. Additionally, a paraffin or the like can preferable be employed as the organic solvent. Moreover, since radicals exist on the surface of activated carbon after the treatment in the inactive atmosphere with a high possibility, there is also a possibility that impurities such as hydroxyl groups and carbonyl groups may again adhere after long use. In this case, the same treatment may be performed under a hydrogen atmosphere, and similar results can still be obtained.

Table 4 shows the evaluation results of the adsorption properties of activated carbons manufactured by the present method, and the method (the vacuum drawing process during the high temperature treatment) of performing the above-described pressure reducing treatment during the high temperature treatment in addition to the present method, when coconut shell was used as raw material. As a comparative example, the evaluation results of activated carbons manufactured by the conventional chemical activating process and the above-described vacuum drawing process during the high temperature treatment are also shown. Additionally, in the present method in Table 4, the organic solvent adsorbed by activated carbon was butane, and was introduced and adsorbed in a gauge pressure of 0.1 MPa at a normal temperature. Moreover, in the subsequent vacuum drawing process, a vacuum of about 1 Torr was maintained.

TABLE 4

| | Present example | | Chemical activating process | |
|---|---|---|---|---|
| | Only present example | Combination with high-temp. and vacuum treatment | Conventional method | High-temp. treatment employing vacuum |
| $V/V_0$ (13A gas, 10 MPa) | 250 | 278 | 130 | 220 |
| Butane | 32 | 25 | 75 | 33 |

TABLE 4-continued

| | Present example | | Chemical activating process | |
|---|---|---|---|---|
| | Only present example | Combination with high-temp. and vacuum treatment | Conventional method | High-temp. treatment employing vacuum |
| adsorption heat (kJ/mol) | | | | |

As can be seen from Table 4, even when the present method was employed alone, the adsorption heat values during butane adsorption indicates that the functional groups were reduced to substantially the same degree as in the chemical activating process in which a vacuum was employed during high temperature treatment. Moreover, the storage density $V/V_0$ of the 13A gas in the pressure of 10 MPa also indicates substantially the same value. When the vacuum drawing treatment during the high temperature treatment was used in concert with the present method, the functional groups were further reduced, and the storage density $V/V_0$ of the 13A gas increased.

When the above-described vacuum drawing during the high temperature treatment was performed, a high vacuum of $10^{-1}$ Torr or less was created, the load on the vacuum pump was increased, and it became difficult to perform a trap treatment on water discharged in a large amount. When the pressure-reducing treatment pressure can be set to a higher pressure, the process of manufacturing activated carbon can be further facilitated.

As a result of research by the present inventors, it was found that by adding lithium bromide or lithium chloride to zinc chloride, and the like for use in the chemical activation, a sufficiently large effect can be obtained, even when the vacuum pressure during the pressure reducing treatment is set to a higher pressure. This is believed to result because lithium bromide and lithium chloride have water absorption properties, and therefore remove moisture from the activated carbon pores. In this case, the addition amount of lithium bromide or lithium chloride is preferably in a range of 10 to 50 wt % with respect to zinc chloride.

Table 5 shows the evaluation results for activated carbon manufactured by the method of adding lithium bromide or lithium chloride to zinc chloride in the above-described ratio, and the evaluation results for activated carbon manufactured by a combination of the present method and the vacuum drawing process with high temperature treatment, in the usual chemical activating treatment using zinc chloride, that is, in the activating treatment in which no pressure reducing treatment is performed during high temperature treatment.

TABLE 5

| | Present example | | | |
|---|---|---|---|---|
| | Only present | Combination with high-temp. vacuum treatment | | Comparative Thermal treatment Using $10^{-2}$ Torr |
| | example | $10^{-2}$ Torr | 10 Torr | vacuum |
| $V/V_0$ (13A gas, 10 MPa) | 180 | 240 | 230 | 220 |
| Butane | 50 | 25 | 33 | 33 |

TABLE 5-continued

| | Present example | | | |
|---|---|---|---|---|
| | Only present | Combination with high-temp. vacuum treatment | | Comparative Thermal treatment Using $10^{-2}$ Torr |
| | example | $10^{-2}$ Torr | 10 Torr | vacuum |
| adsorption heat (kJ/mol) | | | | |

As seen from Table 5, when only the present method is applied to the chemical activating treatment, the sufficient effect of reducing the functional groups and the effect of enhancing the storage density $V/V_0$ of the 13A gas were not obtained. However, when the present method was combined with the vacuum drawing process during the high temperature treatment, there was no difference in the adsorptivity of manufactured activated carbon even between the vacuum pressure of $10^{-2}$ Torr and 10 Torr. As can be seen, when about 10 to 50 wt % of lithium bromide or lithium chloride is added to zinc chloride for use in the chemical activating treatment, the vacuum pressure for the vacuum drawing during the high temperature treatment can be set to a higher pressure, and the process of manufacturing activated carbon can be facilitated.

Additionally, for activated carbon manufactured by the above-described conventional water vapor activating or chemical activating processes, there are problems that the storage density $V/V_0$ of the natural gas is low, and that the repetition of the adsorption/desorption process gradually decreases the storage density $V/V_0$. On the other hand, by performing a thermal treatment as a final process in a hydrogen atmosphere in a range of 200 to 500° C. after performing the water vapor activation or chemical activation, the cut proportion of the storage density $V/V_0$ can be reduced even after the adsorption/desorption is repeatedly performed. Table 6 shows the cut proportion of the storage density $V/V_0$ when 20 cycles of adsorption/desorption were repeated with respect to activated carbon subjected to the above-described process as the final process in the water vapor activating process and chemical activating process.

TABLE 6

| | Water vapor (gas) activating process | | Chemical activating process | |
|---|---|---|---|---|
| | Conventional method | Present example | Conventional method | Present example |
| $V/V_0$ (13A gas, 10 MPa) | 145 | 179 | 130 | 196 |
| Repeatability $V/V_0$ cut propor. after 20 cycles (ratio to initial value) | 80% | 95% | 75% | 102% |

As can be seen from Table 6, when the process of the present embodiment was carried out, the cut proportion of the storage density was enhanced in both the water vapor activating process and the chemical activating process.

Additionally, while the cut proportion of the storage density after the repeated adsorption/desorption can be reduced by the thermal treatment in the hydrogen atmosphere as described above, the storage density $V/V_0$ is reduced b6yrepeated use. Therefore, after performing the treatment in a temperature of 100° C. or more, preferably 200° C. or more in a high vacuum of $10^{-3}$ Torr or more for several hours, high-purity methane with a purity of 99.9% or more is adsorbed, then desorbed. For this desorption the desorption to the extent of the atmospheric pressure is sufficient. However, when the adsorption and desorption of high-purity methane is performed three or more times, the initial adsorption performance of the adsorbent can be substantially restored. This would appear to be because the rinsing of the adsorbent surface by methane inhibits the adsorption of butane, and the like and, therefore, condensation.

Figure 10:
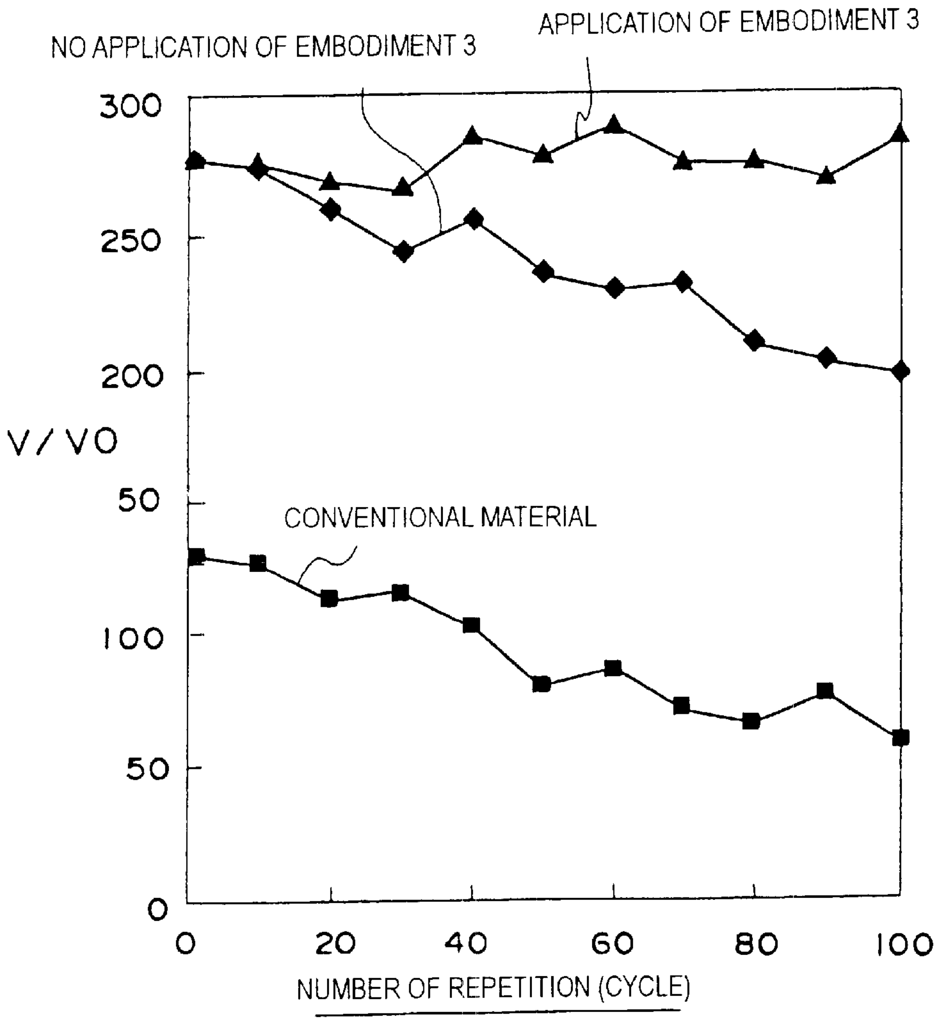
FIG. 10 is a diagram showing a relationship between the number of adsorption/desorption cycles and storage density.

FIG. 10 shows storage density $V/V_0$ values over repetition of adsorption/desorption when the treatment by high-purity methane of the present example was or was not performed on the improved activated carbon subjected to the pressure reducing treatment during the high temperature treatment, further cleaned in the organic solvent and subsequently calcined in the inert gas. Results for conventional activated carbon subjected to no treatment are also shown for comparison.

As shown in FIG. 10, the storage density $V/V_0$ is decreased by repetition of adsorption/desorption in either the conventional material or the improved activated carbon to which the present example is not applied. On the other hand, when the high-purity methane treatment of the present example is performed once every 20 cycles, the initial adsorptivity can substantially be maintained.

Embodiment 4

Activated carbon manufactured in the method of the above-described third example has a high adsorptivity, and the storage density $V/V_0$ of natural gas 13A or the like can be increased. However, when 13A is adsorbed and stored by activated carbon and subsequently desorbed, a large dispersion is sometimes generated in the desorption amount. The present inventors found that isoparaffin-based hydrocarbons can reduce the desorption amount to a greater extent than normal paraffin-based hydrocarbons.

Figure 11:
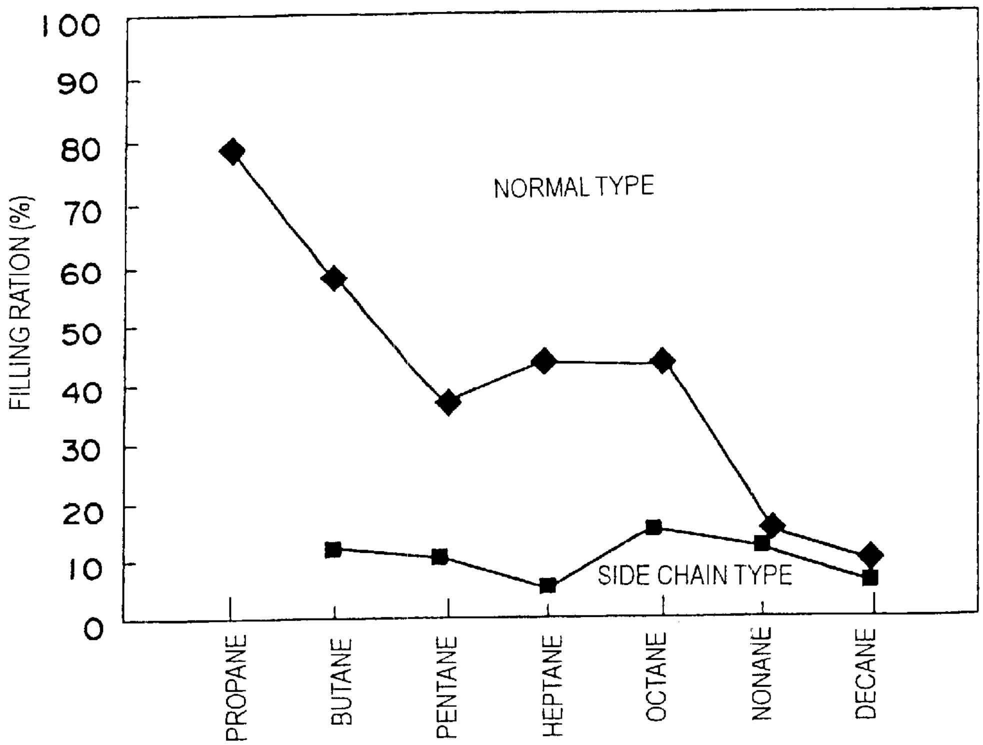
FIG. 11 is a diagram for comparing the filling ratios of straight and side chain olefins.

FIG. 11 shows the filling ratios of various paraffin-based hydrocarbons to activated carbon. In this case, after various paraffin-based hydrocarbons were separated to a normal type and a side chain type (iso-type), and adsorbed by activated carbon in a room temperature, the desorbed amount was measured, the amount inside activated carbon pore filled with various component liquids was set to 100%, and the proportion of the desorption amount was used as the filling ratio. The pressure during the adsorption was set to 0.1 MPa for propane and butane, and to saturation vapor pressures for the other components.

As shown in FIG. 11, in the paraffins from butane to octane, the ordinary paraffins showed a remarkably larger filling ratio than the side chain type in all cases. However, for large-sized molecules such as nonane and decane, there was little difference between the normal type and the side chain type.

This difference in the filling ratio between butane and octane paraffins appears to have resulted because in the side chain type paraffin (isoparaffin), liquefaction easily occurs during the adsorption to activated carbon, the above-described filling success probability lowers, and a sufficient adsorption amount cannot be obtained. Therefore, to adsorb and store natural gas 13A and the like, only the normal paraffins to octane from butane are adsorbed beforehand, and then 13A is adsorbed, so that the unsuccessful filling by the liquefaction during adsorption can be inhibited, and a stable adsorption and storage can be performed. Additionally, the propane shown in FIG. 11 indicates the highest filling ratio, but the energy amount per unit amount contained in the paraffin increases with the increase of carbon number, and the paraffin with a large carbon number is therefore preferable as the normal paraffin to be adsorbed by the adsorbent before the filling of 13A.

Natural gas 13A is composed mostly of methane, but also contains ethane, propane, butane, and the like. Therefore, the above-described effect can be obtained even by separating/removing the side chain paraffin (mainly isobutane) contained in 13A and allowing activated carbon to adsorb and store 13A containing no side chain paraffin, instead of preadsorbing the above-described normal paraffin.

Figure 12:
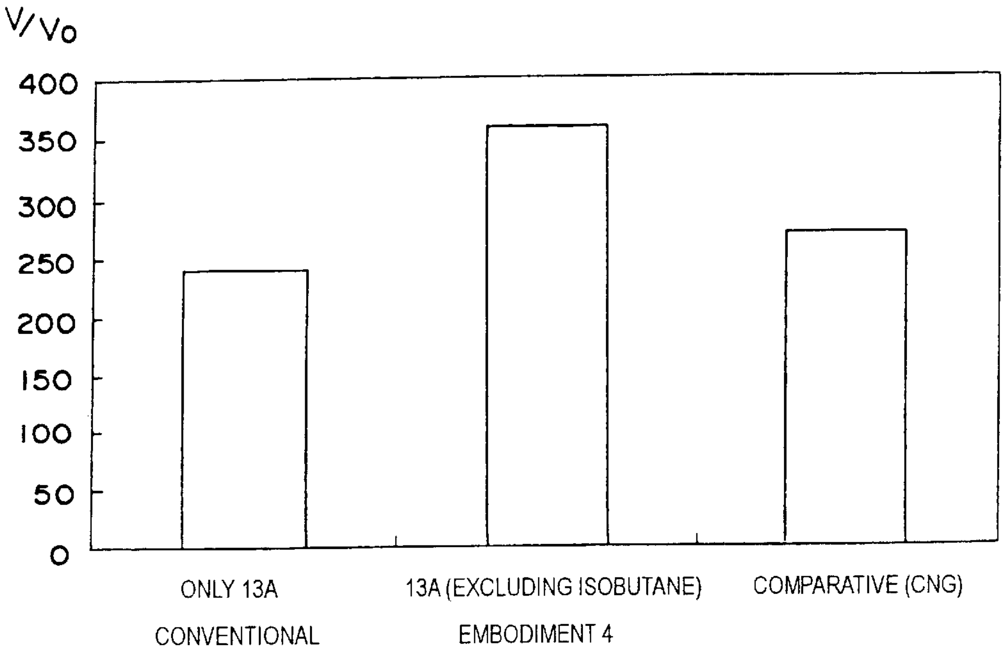
FIG. 12 is a diagram comparing storage densities when isobutane is removed and when not prior to the adsorption of natural gas.

FIG. 12 shows the result of the storage density $V/V_0$ when the 13A and the 13A excluding isobutane are adsorbed and stored by the improved type of activated carbon manufactured in the third example in a room temperature at a pressure of 20 MPa. Moreover, $V/V_0$ of the compressed gas (CNG) of 13A is also shown as a comparative example. As seen from FIG. 12, the 13A excluding isobutane can indicate a more enhanced storage density $V/V_0$ than either the 13A containing isobutane or the CNG.

However, because the isobutane removed from the above-described 13A cannot effectively be utilized, a method of decreasing the use amount of 13A excluding isobutane as much as possible is preferable. Research by the present inventors revealed that in the adsorption and storage of 13A, when the side chain paraffin exists in the initial stage, that is, the stage with a pressure lower than 1 MPa, the filling success probability is largely influenced, and as a result the storage density $V/V_0$ is decreased, but that under a pressure of 1 MPa or more no problem exists even if side chain paraffins are present.

Therefore, when 13A is separated into a first component containing no side chain paraffin and a second component excluding no side chain paraffin, that is, containing the side chain paraffin (ordinary 13A), the first component is adsorbed and stored to a pressure of 1 MPa, and subsequently the ordinary 13A as the second component is adsorbed and stored, a high storage density can be secured, and no isobutane is wasted. Additionally, in this case, the isobutane removed to generate the first component may be mixed into the second component and adsorbed and stored under a high pressure. Thereby, the composition of the components adsorbed and stored by the adsorbent can all be set to the component composition of 13A.

Embodiment 5

Figure 13:
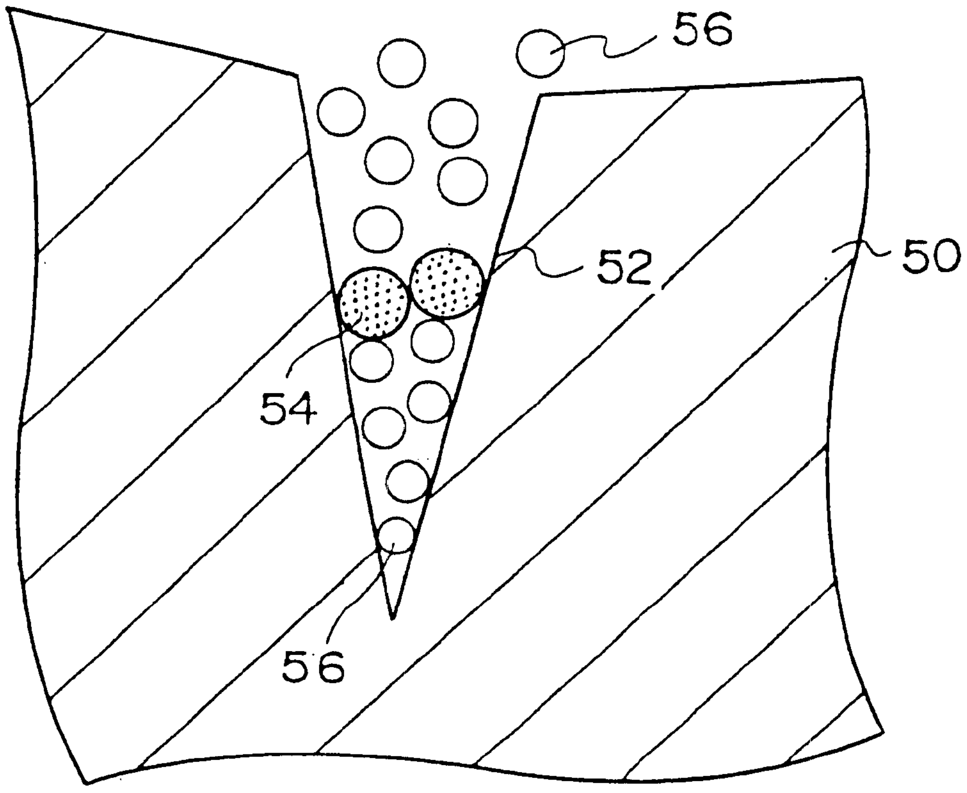
FIG. 13 is a diagram showing the inside of a pore when the storage method of the present invention is carried out.

FIG. 13 shows the inside of the pore 52 of the adsorbent 50 according to the present invention. In FIG. 13, small molecules 56 such as those of gaseous methane and ethane with smaller molecular sizes than propane are adsorbed first by the adsorbent 50 such as activated carbon, before the natural gas is adsorbed. Because these small molecules 56 are adsorbed first, the small molecules 56 can advance into the depth of the pore 52 of the adsorbent 50. Therefore, even when the natural gas is adsorbed later, the small molecules 56 already exist inside the large molecules 54 such as propane and butane contained in the gas. Therefore, during the desorption of the natural gas, the large molecules 54 are pushed outward by the small molecules 56 present in the innermost part of the pore 52, and the large molecules 54 such as propane and butane can be prevented from agglomerating inside the pore 52. Thereby, the volume of the pore 52 can be more efficiently used.

As described above, even when no natural gas is produced, the adsorption amount to the adsorbent 50 need not decrease, and the increase of the adsorption amount can be realized.

Additionally, the components of the grade of natural gas known as 13A are as shown in the following Table 7.

TABLE 7

| Component | Content (mol %) |
|---|---|
| Methane | 88 |
| Ethane | 6 |
| Propane | 4 |
| i-butane | 1.2 |
| n-butane | 0.8 |

As shown in Table 7, propane and butane as large molecules 54 comprise 6% (of the molar volume) of 13A natural gas. The refining and removing of these components is expensive and their removal eliminates 6% of the available gas,. However, by employing the above-described method of the present invention, these large molecules 54 need not be removed, and the gas costs can be lowered.

Moreover, when the gas adsorbed by the adsorbent 50 is all desorbed during desorption, a process of allowing the adsorbent 50 to adsorb high-purity methane gas as the small molecules 56 is necessary to again perform filling with natural gas,. This is a wasteful process when the method of the present invention is employed.

Therefore, the pressure during the adsorption of the small molecules 56 prior to the adsorption of the natural gas is used as a cutoff value upon the reaching of which the desorption is discontinued. It is preferable not to provide a pressure less than or equal to this value. Thereby, since the small molecules 56 such as methane and ethane are constantly adsorbed and maintained inside the pore 52 of the adsorbent 50, the adsorption of the small molecules 56 does not have to be repeated even during the natural gas re-adsorption and refilling.

In this case, a constitution in which the filling container is provided with a pressure sensor, the above-described criterion pressure is pre-stored in a memory, and an alarm is issued to a user based on the criterion pressure, may also be preferable.

An example illustrating the above-described concrete embodiment will next be described.

Example

The Two grams of a coconut shell activated carbon (GA40 manufactured by Cataler Industry Co.) were placed in a pressure container and deaerated to vacuum; gas was introduced up to a relative pressure of two atmospheres; and this was allowed to stand until an activated carbon temperature reaches room temperature. Subsequently, the gas in the pressure container was recovered using a vacuum pump through replacement on water and the results were measured.

Figure 14:
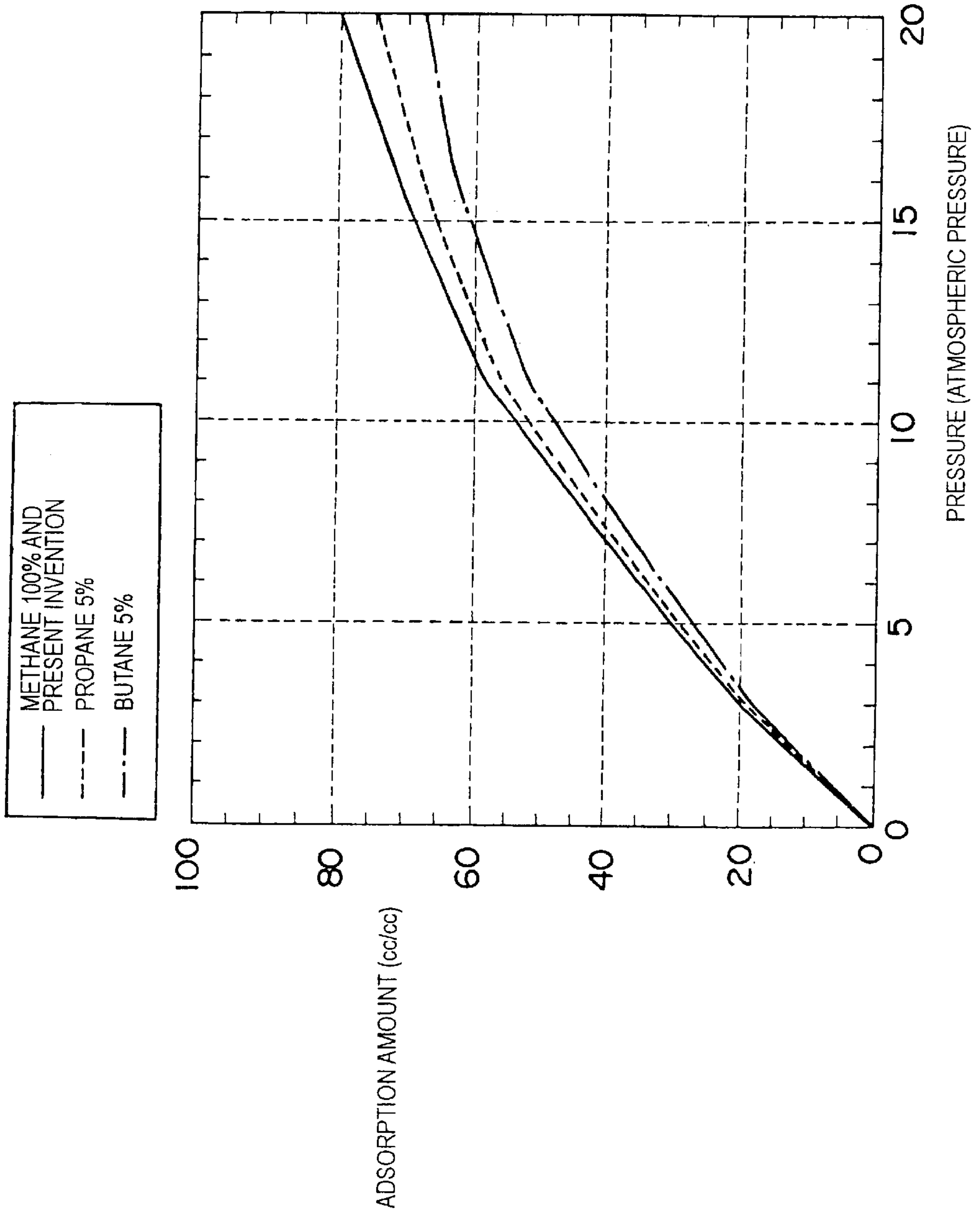
FIG. 14 is comparing the adsorption amount of the present invention with that of a comparative example.
Figure 15:
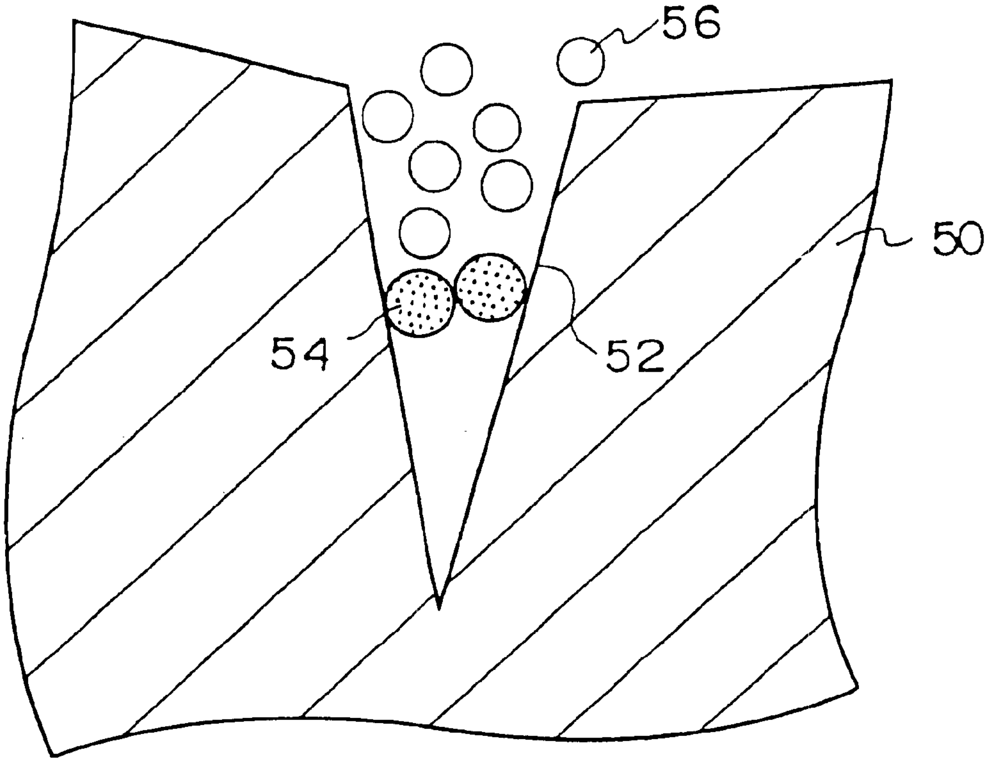
FIG. 15 is a diagram showing the inside of a pore when natural gas is adsorbed using a conventional gas storage method.

FIG. 14 shows these measurement results. In FIG. 14, the gas types used in the present embodiment are shown. In the present embodiment, the above-described measurement was performed with three types of gases as comparative examples. Specifically, these were 100% methane, methane mixed with 5% propane, and methane mixed with 5% butane. As shown in FIG. 14, use of pure methane resulted the largest adsorption amount, and the adsorption amount decreases in order of methane mixed with propane and methane mixed with butane.

On the other hand, as the method of the present invention, pure methane was first adsorbed for one atmosphere, subsequently the gas of methane mixed with propane at a ratio of 5% was adsorbed, then the same adsorption amount was measured as when pure methane was adsorbed.

As described above, according to the method of the present invention, the natural gas need not be refined for use.

Embodiment 6

As described in the background art, for an adsorbent with a small pore diameter, the adsorption phenomenon of natural gas is saturated under a low pressure, the adsorption amount cannot be greatly increased, and it is difficult to desorb the natural gas from the adsorbent. Then, as a result of research on adsorbents which can increase the adsorption amount of natural gas and can easily adsorb the gas, the present inventors found that when the adsorption with a larger pore diameter than that of activated carbon heretofore studied, the natural gas adsorption phenomenon is not saturated to a high pressure, and the desorption of the natural gas is facilitated.

Table 8 shows a relationship between the activated carbon pore diameter and the adsorption/desorption property.

TABLE 8

| | Conventional | Improved material | | |
|---|---|---|---|---|
| | material | A | B | C |
| Pore diameter/peak (angstrom) | from 5/ 7 to 9 | from 10/ 15 | from 10/ 20 | from 15/ 25 |
| $V/V_0$ (saturation pressure (MPa)) | 100 to 180 (1 to 3.5) | 180 (5) | 230 (10) | 300 (18) |
| Desorption ratio (%) atmospheric pressure discharge | 50 to 80 | 90 | 95 | 97 |
| Desorption ratio (%) 0.5 MPa discharge | 20 to 50 | 75 | 85 | 95 |

In Table 8, for activated carbon, heretofore used in the adsorption and storage of the natural gas, with a pore diameter of 5 angstroms or more, and with a pore diameter of 7 to 9 angstroms which is a pore diameter distribution peak, that is, which is included most, the natural gas adsorption amount $V/V_0$ ($V_0$: the volume of a storage container filled with activated carbon, V: the volume of the adsorbed and stored natural gas) values ranged from 100 to 180. With compressed natural gas (CNG), as the resulting $V/V_0$ values were on the order of 240 to 280, the adsorption/storage amount of the conventional material was deemed insufficient. Moreover, because the saturation pressure during the adsorption and storage was in a range of 1 to 3.5 MPa, even with the raised pressure, the adsorption amount did not increase.

Furthermore, for the desorption ratio of the natural gas from the conventional material, when the gas was discharged to the atmospheric pressure, the ratio was in a range of 50 to 80%, but was only in a range of 20 to 50% with discharge to 0.5 MPa.

Three types of activated carbons with enlarged pore diameters were then prepared, and the adsorption properties were similarly measured. First, an improved material A had a pore diameter of 10 angstroms or more and a pore diameter distribution peak of 15 angstroms, but was enhanced in both the adsorption/storage amount and the desorption ratio as compared with the conventional material. Furthermore, it could be seen that in an improved material B (pore diameter of 10 angstroms or more, distribution peak of 20 angstroms), and an improved material C (pore diameter of 15 angstroms or more, distribution peak of 25 angstroms) which are larger in pore diameter and pore diameter distribution peak than the improved material A, as the pore diameter was increased, the adsorption/storage amount and the desorption ratio were enhanced. Particularly, the improved material C achieved an adsorption amount $V/V_0$=300, which is larger than the above-described value for compressed natural gas. The saturation pressure of the improved material C was, in fact, as high as 18 MPa. Moreover, for the desorption ratio of the improved material C, 95% could be desorbed even with discharge to 0.5 MPa, and the desorption ratio is remarkably higher than that of the conventional material. Therefore, it can be seen that the adsorbed and stored natural gas can remarkably easily be used. It should also be noted that the values of desorption ratio were for states in which the activated carbon was not heated.

As described above, the improved material C shown in Table 1 indicates the most satisfactory adsorption property, but in the improved material C, the content of pores with a pore diameter of 10 angstroms or less is preferably set to 0.1 cc/g or less. When the volume or number of pores with a pore diameter of 10 angstroms or less increases, the amount of pores saturated with a low pressure accordingly increases. The adsorption amount cannot be increased, and the drop of the desorption ratio is great.

As described above, both the adsorption amount and the desorption ratio of the natural gas were enhanced with further increase of the activated carbon pore diameter. However, the optimum pore diameter for maximizing the adsorption amount $V/V_0$ was also studied. The natural gas adsorption amount $V/V_0$ can be represented by the product of V/VR (VR denotes an activated carbon pore volume) which is the adsorption amount of the natural gas in the activated carbon pores and $VR/V_0$, being the volume ratio occupied by the pores in the adsorption container. To increase $V/V_0$, both V/VR and $VR/V_0$ must be increased as much as possible.

Figure 16:
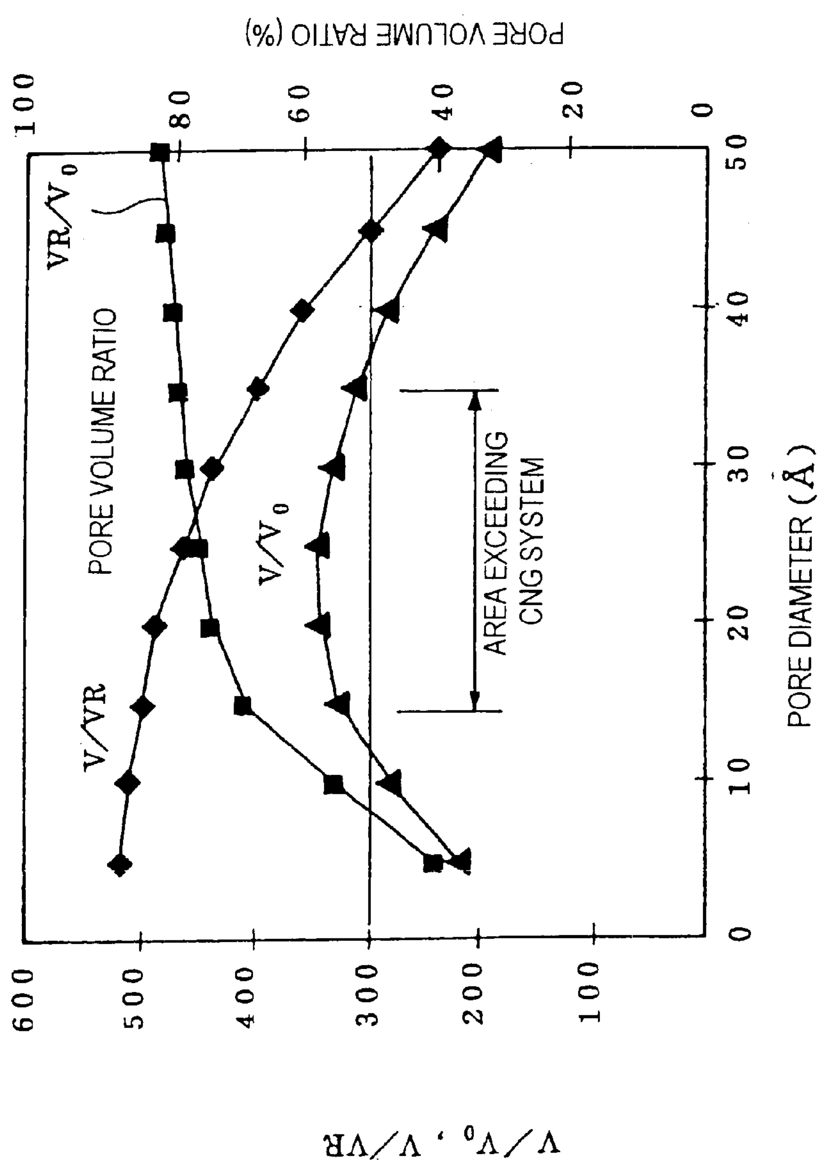
FIG. 16 is a diagram showing a relationship between pore diameters and adsorption properties.

FIG. 16 shows a relationship of the above-described V/VR, $VR/V_0$ and $V/V_0$. As shown in FIG. 16, when only the inside of the activated carbon pore was observed, the value of V/VR which is the adsorption amount of the natural gas in the pores became larger for smaller pore diameters. These values were measurement results under the saturation pressure in each pore diameter. However, the value of the pore volume ratio $VR/V_0$ increased with the increase of the pore diameter. Therefore, the product $V/V_0$ of these values takes the maximum value in the constant range of pore diameters. As shown in FIG. 16, when the values $V/V_0$ are 300 or more, thereby exceeding the value of the compressed natural gas, the range of the pore diameters was on the order of 12 to 35 angstroms.

As a result of the above, the activated carbon pore diameters would appear to preferably be in a range of 12 to 35 angstroms, but, as the saturation pressure also increases with an increase of the pore diameter, the maximum value is more preferably on the order of 20 angstroms in consideration of the convenience of the practical use. This is because the upper limit of the gas pressure which normally stored is 20 MPa in Japan and 25 MPa in the United States, and therefore the pore diameters saturated at these pressures should be selected.

Moreover, with a pore diameter of 12 angstroms or less, the proportion occupied by skeletons in activated carbon increases, the pore volume ratio is reduced, $VR/V_0$ decreases below 70%, and, as a result, the natural gas adsorption amount $V/V_0$ is also decreased. Therefore, the lower limit value of the activated carbon pore diameters is preferably 12 angstroms.

It is considered from the above that the optimum range of the activated carbon pore diameters is preferably 12 to 20 angstroms. Thereby, the natural gas adsorption/storage amount of the order of $V/V_0$=300 to 350 can be realized which exceeds the compressed natural gas adsorption amount $V/V_0$=240 to 280.

Subsequently, it was found that when the pore surface of activated carbon as the adsorbent for use in the natural gas adsorption and storage according to the present invention carried certain metals, the value of the in-pore natural gas adsorption amount V/VR could further be enhanced. Examples of such metals include Cu, Fe, Ag, Au, Ir, W, and the like.

Table 9 shows the adsorption property when the above-described metal ions were employed with respect to activated carbon of the improved material B of Table 8.

TABLE 9

| | B | Metal ion carrying material | | | |
|---|---|---|---|---|---|
| | (Table 1) | Ir | Au | Ag | W |
| Pore diameter/ peak (angstrom) | from 10/ 20 | same as left | same as left | same as left | same as left |
| V/VR 15 MPa | 500 | 540 | 536 | 513 | 510 |
| V/VR 5 MPa | 330 | 327 | 330 | 328 | 330 |
| Amount (wt %) | 0 | 10 | 10 | 10 | 10 |

As shown in Table 9, when the activated carbon pore surfaces carry Ir, Au, Ag, and W at each ratio of 10%, substantially the equal adsorption amount was found at a storage pressure of 5 MPa, and an improved adsorption amount was recognized at storage pressure of 15 MPa. Therefore, introducing the above-described metals to the activated carbon pore surface was shown to be effective in increasing the storage amount for high pressure adsorption and storage. The above-described metals can be introduced to the activated carbon pore surfaces by, for example, immersing the adsorbent in an aqueous solution of metal chloride, and the like dissolved therein, evaporating water at a temperature of 80 to 100° C., drying the adsorbent, and subsequently calcinating the adsorbent at around 600° C. for about three hours. Additionally, when the amount of the metal is reduced below 5 wt %, no effect is produced. Moreover, when the amount exceeds 50 wt %, the activated carbon pore volume decreases. In either case, no increase of the adsorption amount is recognized. Therefore, the amount of the metal to be carried should preferably be in a range of 5 to 50 wt %.

In the above, activated carbon was used as the natural gas storing adsorbent, but besides activated carbon, silica-based adsorbents such as zeolite and FSM can also be employed.

As described above, according to the present invention, because the carbon components are separated and then adsorbed and stored independently by the adsorbent, the optimum adsorption environment can be obtained according to carbon number, and the storage density can be enhanced.

Moreover, by setting the pore diameter of the adsorbent to adsorb the high carbon number component to a small value, the high carbon number component can more easily be adsorbed, and separation/adsorption of the high carbon components from normally flowing natural gas can be easily performed.

Furthermore, by disposing the cooling means in the tank for adsorbing and storing the high carbon number component, the high carbon component can be condensed, and separation of the high and low carbon components can be promoted.

Additionally, by first introducing the natural gas to the tank for adsorbing and storing the high carbon number component and then lowering the pressure, the condensed core of the high carbon number component can surely be formed.

Moreover, during the desorption from the tank for adsorbing and storing the low carbon component, the separated components can easily be mixed via the tank for adsorbing and storing the high carbon number component.

Furthermore, by heating the adsorbent during the adsorption and storage of the natural gas to the adsorbent, condensation of the high carbon number component can be suppressed without separating the low carbon component and high carbon number component, and the storage density can thereby be enhanced.

Additionally, by lowering the heating temperature with the progress of adsorption, reduction of adsorption amount due to rise in temperature can be restricted.

Moreover, during the adsorption and storage of the natural gas to the adsorbent, by performing the adsorption while allowing the natural gas to flow through the gap between the adsorbents, the condensation of the high carbon number component can be suppressed without heating the adsorbent, and the storage density can thereby be enhanced.

Furthermore, because smaller diameter molecules with small molecular sizes are adsorbed first in the pores, and the natural gas is adsorbed thereafter, the large diameter natural gas molecules are located outside the smaller particles and are therefore more easily desorbed and are prevented from agglomerating inside the pore. The adsorption amount can thereby be maintained even when less pure natural gas is employed.

Additionally, during the desorption of the natural gas, the desorption can be performed to the pressure at which the small diameter molecules were adsorbed. Therefore, even when the natural gas is refilled, the refilling of the smaller molecules can be omitted, and the filling operation can be simplified.

Moreover, when the pressure reducing treatment is used in a combined manner during the high temperature treatment in the activating treatment for manufacturing the adsorbent, there are fewer hydroxyl groups inside the resulting adsorbent, and the high carbon components are inhibited from condensing.

Furthermore, by adding lithium bromide or lithium chloride to the chemical for the activating treatment, the dehydrating effect can be enhanced, and the hydroxyl groups inside the adsorbent pores can be further reduced.

Additionally, by rinsing the activated carbon with an organic solvent, and subsequently calcining the carbon in the inactive atmosphere or hydrogen atmosphere, the hydroxyl groups inside the adsorbent pores can be reduced.

Moreover, by first allowing the adsorbent to adsorb normal paraffin before adsorbing the natural gas, the storage density can be increased.

Furthermore, by allowing the adsorbent to adsorb only natural gas from which the side chain paraffin has been eliminated, the storage density can be further enhanced.

Additionally, when natural gas containing no side chain paraffin is used during adsorption under low pressure, and then natural gas containing the side chain paraffin is adsorbed after the pressure is increased, the storage density can still be enhanced.

Moreover, by controlling the natural gas storing adsorbent pore diameter to a predetermined value, high natural gas adsorption properties and satisfactory desorption properties can both be secured.

What is claimed is:

1. An adsorption storage method of a natural gas which comprises the steps of separating the natural gas into a low carbon component and a high carbon component having a greater number of carbons than ethane, and independently adsorbing and storing in an adsorbent the low carbon component in a first adsorption tank containing the adsorbent to adsorb and store the low carbon component under a high pressure and the high carbon component in a second adsorption tank containing the adsorbent to adsorb and store the high carbon component under a low pressure.

2. The adsorption storage method of the natural gas according to claim 1 wherein the pore diameter of the adsorbent contained in the second adsorption tank is smaller than that of the adsorbent contained in the first adsorption tank, and the natural gas is supplied to the first adsorption tank via the second adsorption tank.

3. The adsorption storage method of the natural gas according to claim 2 wherein the second adsorption tank is provided with a cooling means.

4. The adsorption storage method of the natural gas according to claim 3 comprising the steps of temporarily introducing the natural gas into the second adsorption tank, once lowering the pressure in the tank, and again introducing the natural gas into the second adsorption tank.

5. The adsorption storage method of the natural gas according to any one of claims 2 to 4 wherein, when the stored natural gas is desorbed and used, the gas desorbed from the first adsorption tank is removed via the second adsorption tank.

6. An adsorption storage method of a natural gas comprising the steps of:

selecting a natural gas having a low carbon component and a high carbon component having a greater number of carbons than ethane;

separating the natural gas into the low carbon component and the high carbon component;

heating an adsorbent; and allowing the heated adsorbent to independently adsorb the low carbon component in a first adsorption tank under a high pressure and the high carbon component in a second adsorption tank under a low pressure.

7. The adsorption storage method of the natural gas according to claim 6 wherein the adsorbent is heated to a temperature of 20° C. or more.

8. An adsorption storage method of the natural gas according to claim 6 wherein the temperature of the adsorbent is lowered as the adsorption of the natural gas progresses.

9. An adsorption storage method according to claim 6 further comprising the steps of:

adsorbing methane or ethane in the adsorbent.

10. An adsorption storage method of a natural gas having a high carbon component and a low carbon component, to an adsorber, comprising the steps of:

adsorbing methane or ethane in the adsorbent;

adsorbing the high carbon component of the natural gas in the adsorbent;

desorbing the natural gas from the adsorbent under a pressure not greater than a pressure under which the methane or ethane was adsorbed; and again adsorbing the natural gas without again adsorbing methane or ethane.

11. The adsorption storage method of the natural gas according to claim 9 or 10 wherein methane or ethane is pure methane or ethane.

12. An adsorption storage method of a natural gas using activated carbon subjected to a pressure reducing treatment during a high temperature treatment in an activating treatment, comprising the step of adsorbing a normal paraffin before adsorbing the natural gas.

13. An adsorption storage method of a natural gas using activated carbon subjected to a pressure reducing treatment during a high temperature treatment in an activating treatment, comprising the step of separating/removing a side chain paraffin from the natural gas prior to adsorbing the natural gas.

14. An adsorption storage method of a natural gas using activated carbon subjected to a pressure reducing treatment during a high temperature treatment in an activating treatment, which comprises the steps of, before absorbing the natural gas, separating the natural gas into a first component containing no side chain paraffin and a second component containing side chain paraffin, adsorbing the first component, and then adsorbing the second component.

15. An adsorption storage method of a natural gas according to any one of claims 12 to 14, wherein the activated carbon is treated with an activating treatment agent comprising lithium bromide or lithium chloride.

16. An adsorption storage method of a natural gas using activated carbon rinsed with an organic solvent and subsequently calcined in an inactive atmosphere or a hydrogen atmosphere in an activating treatment, said method comprising the step of adsorbing a normal paraffin before adsorbing the natural gas.

17. An adsorption storage method of a natural gas using activated carbon rinsed with an organic solvent and subsequently calcined in an inactive atmosphere or a hydrogen atmosphere in an activating treatment, said method comprising the step of separating/removing a side chain paraffin from the natural gas prior to adsorbing the natural gas.

18. An adsorption storage method of a natural gas using activated carbon rinsed with an organic solvent and subsequently calcined in an inactive atmosphere or a hydrogen atmosphere in an activating treatment, said method comprising the steps of, before absorbing the natural gas, separating this natural gas into a first component containing no side chain paraffin and a second component containing side chain paraffin, adsorbing the first component, and then adsorbing the second component.

19. A method of adsorption and storage of a natural gas, the natural gas comprising a low carbon component and a high carbon component, comprising the steps of:

providing an adsorbent for separating the natural gas into the low carbon component and the high carbon component, the adsorbent having pores with pore diameters of 10 angstroms or more, wherein a number of carbons in the high carbon component is greater than a number of carbons in ethylene; and allowing the adsorbent to independently adsorb the low carbon component in a first adsorption tank under a high pressure and the high carbon component in a second adsorption tank under a low pressure.

20. The method according to claim 19 wherein the adsorbent is provided with a distribution peak of the pore diameters between 12 to 35 angstroms.

21. The method of claim 1, wherein the low carbon component comprises methane.

22. The method of claim 1, wherein the low carbon component comprises ethane.

* * * * *